United States Patent
Pierce et al.

(10) Patent No.: US 8,292,313 B2
(45) Date of Patent: Oct. 23, 2012

(54) HEAVY-DUTY AXLE-TO-BEAM CONNECTION

(75) Inventors: Phillippi R. Pierce, Canton, OH (US); R. Scott Fulton, Hudson, OH (US); Kimm L. Carr, Canton, OH (US); Dane Gregg, Uniontown, OH (US); Kevin J. Erdmann, Mitchell, SD (US)

(73) Assignee: Hendrickson USA, L.L.C., Itasca, IL (US)

( * ) Notice: Subject to any disclaimer, the term of this patent is extended or adjusted under 35 U.S.C. 154(b) by 138 days.

(21) Appl. No.: 13/007,807

(22) Filed: Jan. 17, 2011

(65) Prior Publication Data

US 2011/0175313 A1   Jul. 21, 2011

Related U.S. Application Data

(60) Provisional application No. 61/295,822, filed on Jan. 18, 2010.

(51) Int. Cl.
*B60G 9/00* (2006.01)
(52) U.S. Cl. .................................................. 280/124.11
(58) Field of Classification Search ............. 280/124.11, 280/124.116, 124.128, 124.153
See application file for complete search history.

(56) References Cited

U.S. PATENT DOCUMENTS

| | | |
|---|---|---|
| 3,332,701 A | 7/1967 | Masser |
| 3,707,298 A * | 12/1972 | Henry et al. ........... 280/124.116 |
| 3,861,708 A | 1/1975 | Fier |
| 3,902,734 A | 9/1975 | Fier |
| 3,904,220 A | 9/1975 | Fier |
| 4,000,913 A | 1/1977 | Gibson |
| 4,166,640 A | 9/1979 | Van Denberg |
| 4,293,145 A | 10/1981 | Taylor |
| 4,693,486 A | 9/1987 | Pierce et al. |
| 4,858,949 A | 8/1989 | Wallace et al. |
| 5,002,305 A | 3/1991 | Raidel |
| 5,037,126 A | 8/1991 | Gottschalk |
| 5,039,124 A | 8/1991 | Widmer |
| 5,112,078 A | 5/1992 | Galazin et al. |
| 5,116,075 A | 5/1992 | Pierce |

(Continued)

FOREIGN PATENT DOCUMENTS

DE  29615286 U1  4/1996

(Continued)

*Primary Examiner* — Faye M. Fleming
(74) *Attorney, Agent, or Firm* — Krugliak, Wilkins, Griffiths & Dougherty Co., L.P.A.; David P. Dureska; Brent L. Moore

(57) ABSTRACT

An axle-to-beam connection for axle/suspension systems includes a pair of U-bolt brackets that extend generally to or beyond a selected centerline of the axle. The U-bolt brackets are located a distance from one another so that the distance between the U-bolt brackets is equivalent to or preferably less than the outside diameter of the axle resulting in a slight deformation of the axle and a compressive preload between the axle and the U-bolt brackets when the axle is seated between the U-bolt brackets. A weld is placed between the U-bolt brackets and the axle at or beyond the horizontal centerline of the axle within the residual compressive stress field on the axle created by the interference fit of the axle into the U-boll brackets. Means for securing connection of the axle to the beam includes a U-boll or other similar means to provide additional locating support to the axle.

17 Claims, 18 Drawing Sheets

U.S. PATENT DOCUMENTS

| | | |
|---|---|---|
| 5,127,668 A | 7/1992 | Raidel |
| 5,203,585 A | 4/1993 | Pierce |
| 5,328,159 A | 7/1994 | Kaufman et al. |
| 5,366,237 A * | 11/1994 | Dilling et al. .......... 280/124.116 |
| 5,375,871 A | 12/1994 | Mitchell et al. |
| 5,476,251 A | 12/1995 | Moses et al. |
| 5,634,655 A | 6/1997 | Chalin |
| 5,639,110 A | 6/1997 | Pierce |
| 5,649,719 A | 7/1997 | Wallace et al. |
| 5,690,353 A | 11/1997 | Vandenberg |
| 6,209,895 B1 * | 4/2001 | Mueller et al. ......... 280/124.116 |
| 6,508,482 B2 | 1/2003 | Pierce et al. |
| 7,347,435 B2 | 3/2008 | Chalin |
| 7,669,866 B2 * | 3/2010 | Peaker et al. .......... 280/124.128 |
| 2001/0020775 A1 | 9/2001 | Pierce et al. |

FOREIGN PATENT DOCUMENTS

| | | |
|---|---|---|
| EP | 0240649 A3 | 8/1987 |
| EP | 0625440 A1 | 11/1994 |
| WO | WO9706022 A1 | 2/1997 |
| WO | WO9742047 A1 | 11/1997 |

\* cited by examiner

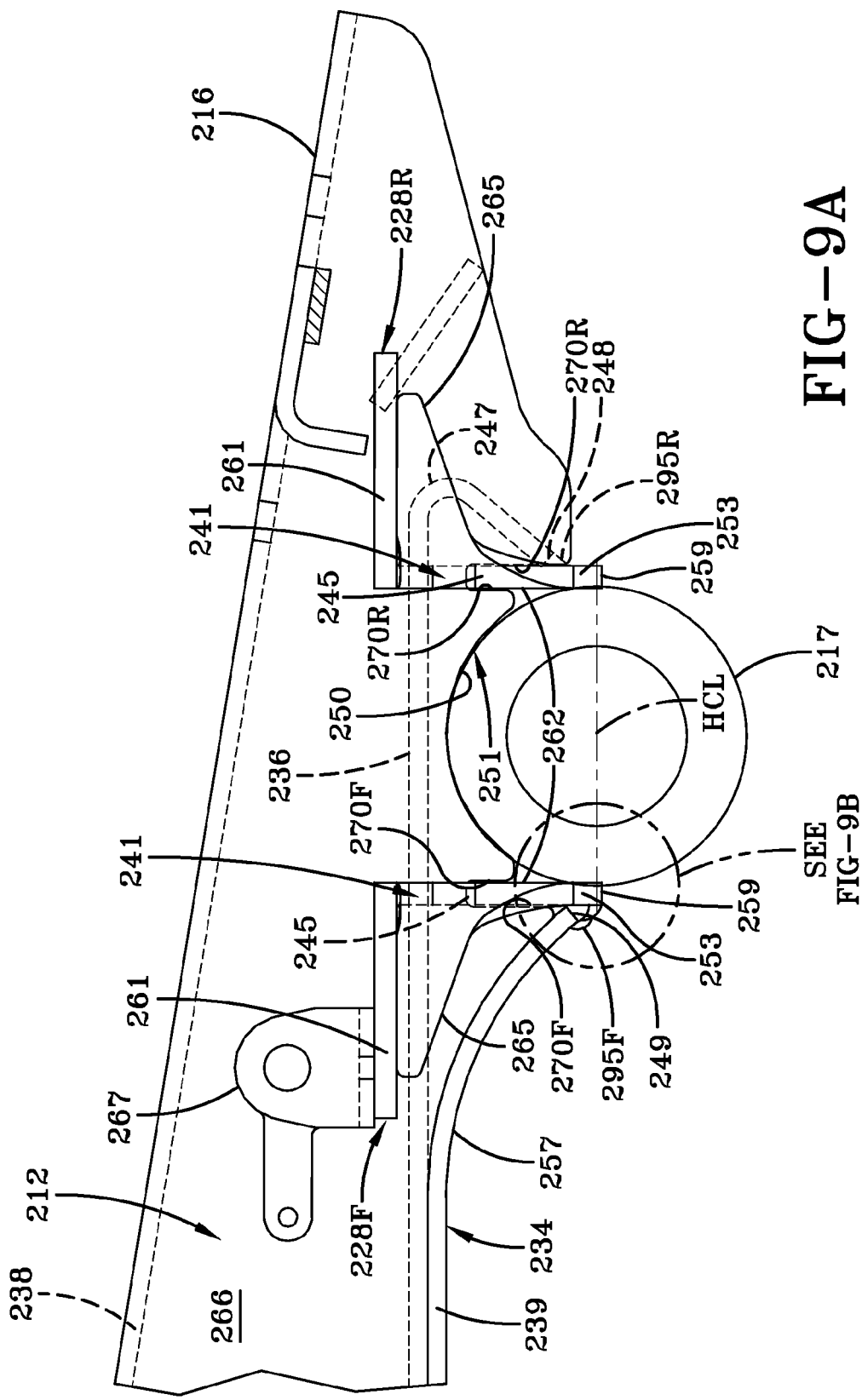

HEAVY-DUTY AXLE-TO-BEAM CONNECTION

CROSS-REFERENCE TO RELATED APPLICATION

This application claims the benefit of U.S. Provisional Patent Application Ser. No. 61/295.822, filed Jan. 18, 2010.

BACKGROUND OF THE INVENTION

1. Field of the Invention

The invention relates to vehicle axle/suspension systems, and in particular to the suspension assemblies of those systems which are useful for heavy-duty vehicles such as trucks and tractor-trailers. More particularly, the invention is directed to a heavy-duty trailing or leading arm rigid beam-type suspension assembly for trucks and tractor-trailers, in which the axle is securely and efficiently connected to the beams by an improved U-bolt bracket/axle seal. The improved U-bolt bracket/axle seal, together with the manner in which the axle-to-beam connection is assembled, increases weld fatigue life and increases durability of the axle at or near the axle-to-beam connection. More specifically, this is accomplished by providing a structure whereby certain loads imparted on the axle-to-beam connection during operation of the vehicle are shared between the U-bolt bracket/axle seat, the welds used to attach the axle to the U-bolt bracket/axle seat, and the beam, and by optionally placing these welds in a residual compressive stress field on the axle.

2. Background Art

The use of air-ride trailing and leading arm rigid beam-type axle/suspension systems has been very popular in the heavy-duty truck and tractor-trailer industry for many years. Air-ride trailing and leading arm spring beam-type axle/suspension systems also are often used in the industry. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of: primary frames, movable subframes and non-movable subframes.

Specifically, each suspension assembly of an axle/suspension system includes a longitudinally extending elongated beam. Each beam is located adjacent to and below a respective one of a pair of spaced-apart longitudinally extending main members and one or more cross members which form the frame of the vehicle. More specifically, each beam is pivotally connected at one of its ends to a hanger which in turn is attached to and depends from a respective one of the main members of the vehicle. An axle extends transversely between and typically is connected by some means to the beams of the pair of suspension assemblies at a selected location from about the mid-point of each beam to the end of the beam opposite from its pivotal connection end. The opposite end of each beam also is connected to a bellows air spring or its equivalent, which in turn is connected to a respective one of the main members. A brake assembly and one or more shock absorbers also are mounted on each of the beams and/or axle. A height control valve is mounted on the hanger and is operatively connected to the beam in order to maintain the ride height of the vehicle. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle.

The beam on which the axle is mounted is typically either a top-mount/overslung beam or a bottom-mount/underslung beam. An axle is mounted on the top of and is supported by the bottom-mount/underslung beam-type, with generally an upper portion of the axle being exposed. Welding alone typically is inadequate to maintain the integrity of the rigid axle-to-beam connection for both bottom-mount/underslung and top-mount/overslung beams due to certain loads to which the axle-to-beam connection is subjected during vehicle operation. Therefore, both bottom-mount/underslung and top-mount/overslung axle-to-beam mounts are fortified in some manner to maintain the mount integrity and prevent separation of the axle from the beams. Such fortification usually includes additional mounting hardware such as U-bolts, U-bolt brackets/axle seats, welds, and the like, resulting in a secure axle-to-beam connection more capable of withstanding operational loads.

However, even with such fortification, these prior art axle-to-beam connections can still potentially exhibit less than optimal fatigue life of the weld between the axle and the U-bolt bracket/axle seat as well as less than optimal durability of the axle itself at or near the axle-to-beam connection. This can potentially occur because the loads acting on the axle are transferred almost entirely through the weld that attaches the U-bolt bracket/axle seat to the axle.

Therefore, a need exists in the art for an axle-to-beam connection for axle/suspension systems, which utilizes an improved axle-to-beam connection whereby certain loads imparted on the axle-to-beam connection during operation of the vehicle are shared between the U-bolt bracket/axle seat, the weld, and the beam. A need also exists in the art for an axle-to-beam connection for axle/suspension systems, which replaces the known prior art U-bolt bracket/axle seat, that changes the location of certain welds relative to the axle and the U-bolt bracket/axle seat, and that optionally places the welds generally within a residual compressive stress field created on the axle. As a result of sharing loads between the U-bolt bracket/axle seat, the weld and the beam, and optionally locating the welds generally within a residual compressive stress field, the axle-to-beam connection reacts loads belter than known prior art axle-to-beam connections, increases the fatigue life of the welds of the axle-to-beam connection and increases durability of the axle at or near the axle-to-beam connection, resulting in a longer life axle-to-beam connection.

SUMMARY OF THE INVENTION

Objectives of the present invention include providing an axle-to-beam connection for axle/suspension systems that increases weld fatigue life at the axle-to-beam connection.

Another objective of the present invention includes providing an axle-to-beam connection that increases durability of the axle at or near the axle-to-beam connection.

These objectives and advantages are obtained by the axle-to-beam connection for a suspension assembly of an axle/suspension system of the present invention which includes an axle, the axle having an outside diameter; a beam, the beam including: a pair of brackets, the brackets being located a distance from one another to form at least a portion of an axle seat, the distance between the brackets being equal to or less than the axle outside diameter, the axle being disposed in the axle seat and between the brackets, the brackets extending to or beyond a selected centerline of the axle, the axle being fixedly attached to the brackets; and a means for securing the connection of the axle to the beam.

BRIEF DESCRIPTION OF THE SEVERAL VIEWS OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

FIG. 9A is a view similar to FIG. 9, but with the U-bolt removed and with portions in section and with hidden parts represented by broken lines, showing the interference fit of the axle between interconnecting members of the front and rear U-bolt brackets/axle seats;

Similar numerals refer to similar parts throughout the drawings.

DESCRIPTION OF THE PREFERRED EMBODIMENT

So that the environment in which the new and improved axle-to-beam connection of the present invention is utilized can be best understood, an axle/suspension system which utilizes a conventional prior an axle-to-beam connection including welds, U-bolts. U-bolt brackets/axle seats and their associated hardware will be described immediately below.

Figure 1:
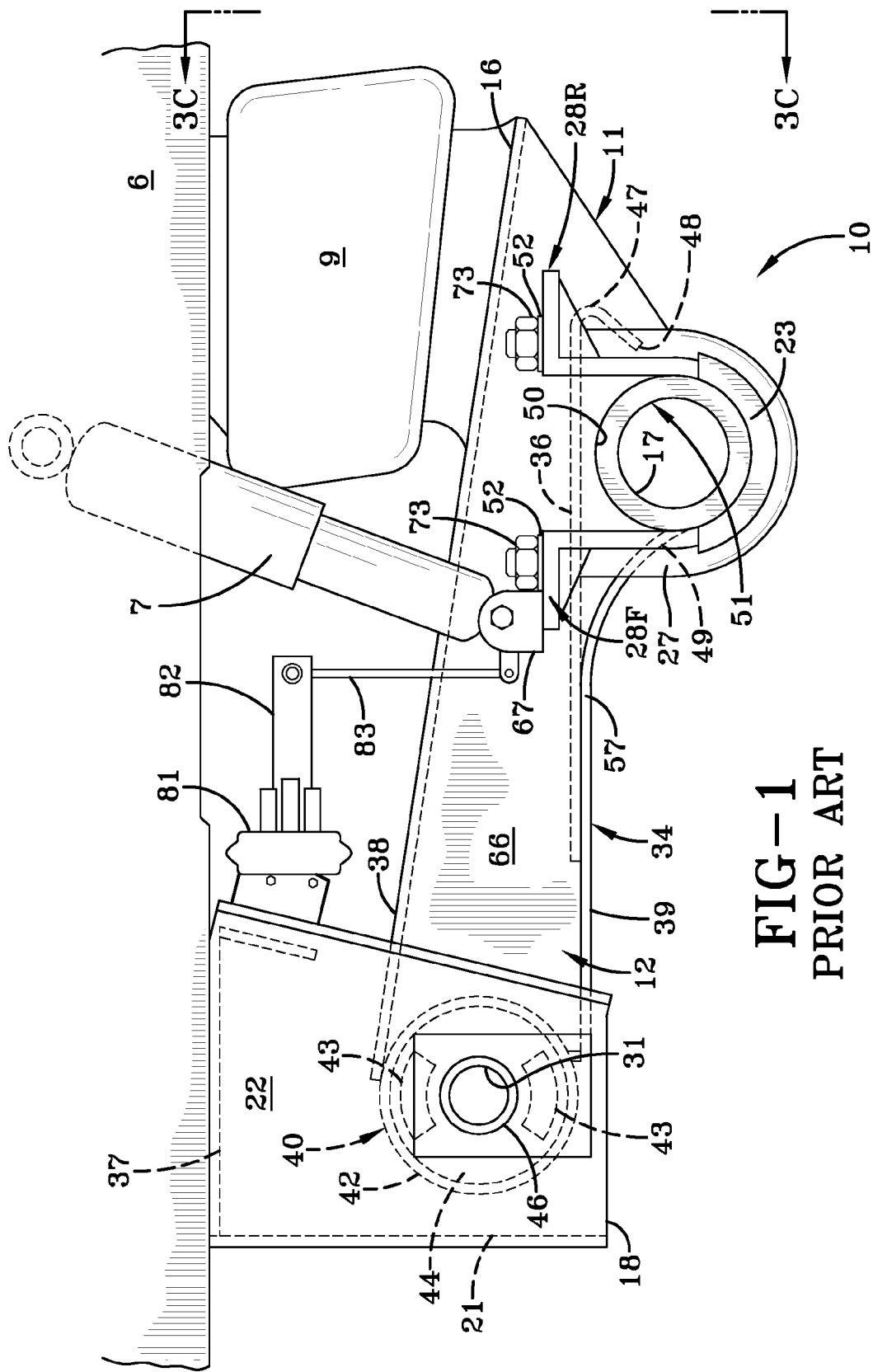
FIG. 1 is a fragmentary elevational view of a prior art axle-to-beam connection, showing one of a pair of suspension assemblies mounted on a vehicle frame, with hidden portions represented by broken lines, and showing the axle connected to the beam utilizing prior art axle-to-beam connections including welds (not shown), U-bolts and U-bolt brackets/axle seats.
Figure 2:
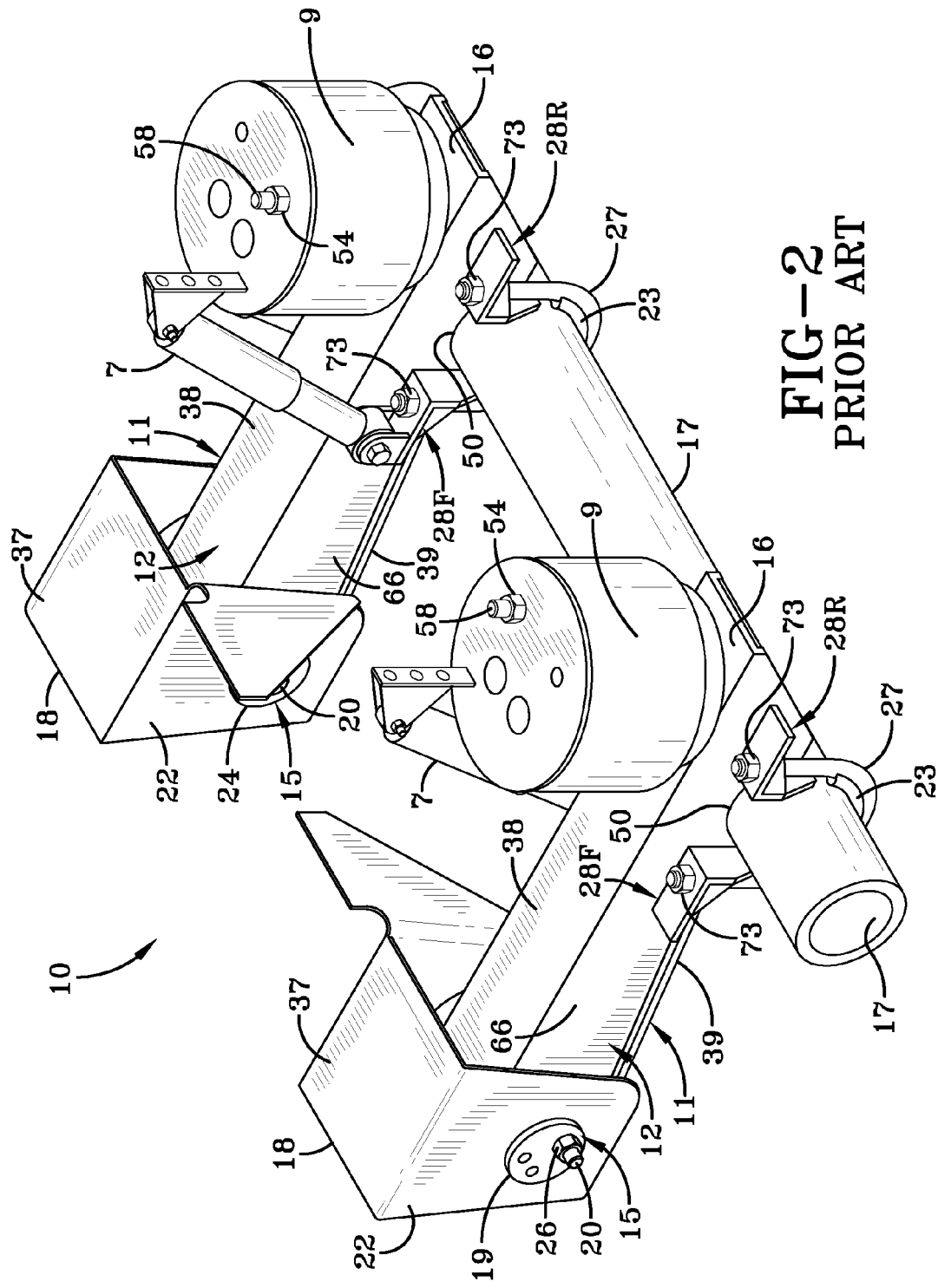
FIG. 2 is a lop rear driver-side perspective view of a pair of suspension assemblies of the type shown in FIG. 1 incorporated into a prior art axle/suspension system pivotally attached to a pair of hangers, showing the axle connected to each of the beams utilizing the prior art axle-to-beam connection including welds (not shown), U-bolts and U-bolt brackets/axle seats.

An air-ride trailing arm rigid overslung/top-mount beam-type axle/suspension system is indicated generally by reference numeral 10 and is shown in FIGS. 1 and 2. Axle/suspension system 10 is the subject of U.S. Pat. No. 5,037,126, is available from the assignee of the present invention, and is commercially sold as the HT Series Axle/Suspension System. Inasmuch as axle/suspension system 10 comprises an identical pair of suspension assemblies 11 mounted on a pair of transversely spaced frame hangers 18 depending from main members 6, only one of the suspension assemblies will be described herein.

Figure 3A:
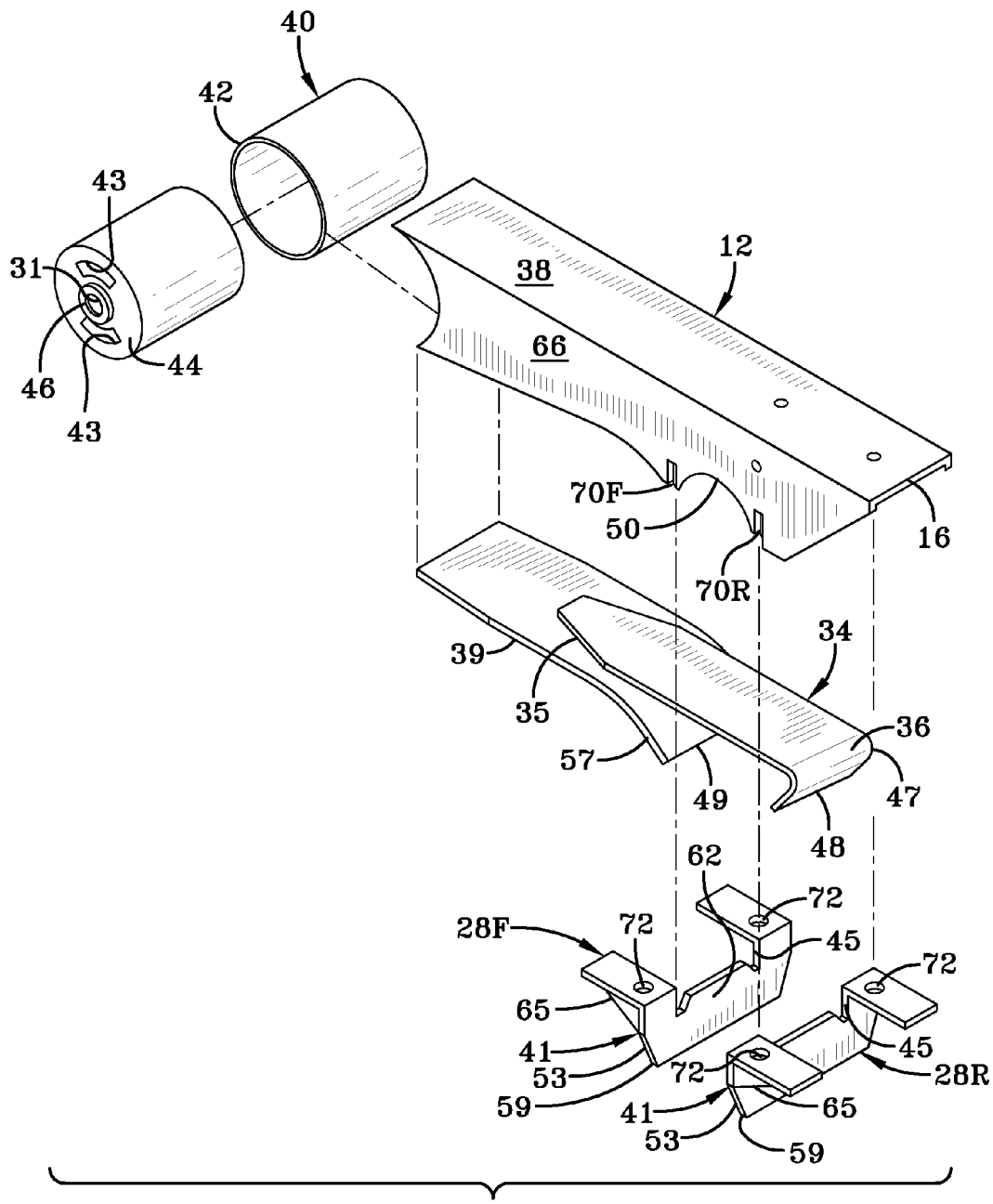
FIG. 3A is an exploded view of the component parts of the beam construction of the suspension assembly shown in FIG. 1, and showing the U-bolt brackets/axle seats and other component parts of the overslung/top-mount beam.
Figure 3B:
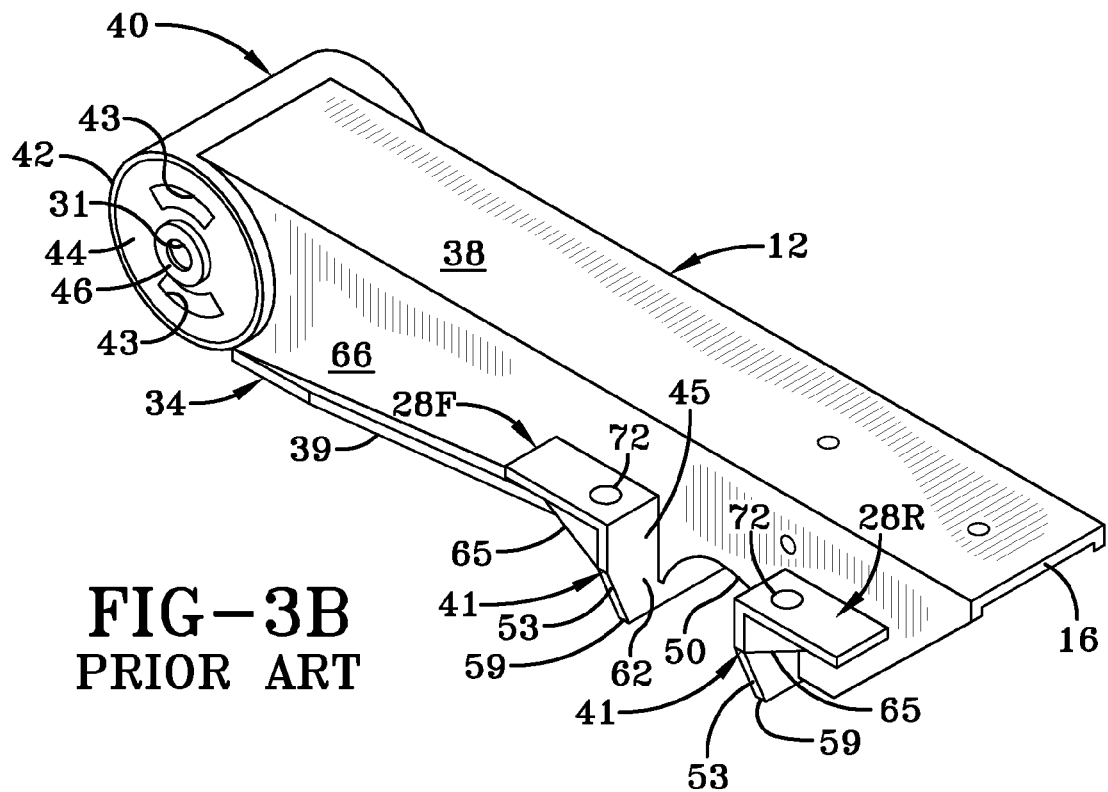
FIG. 3B is a perspective view of the assembled component parts shown in FIG. 3A.
Figure 3C:
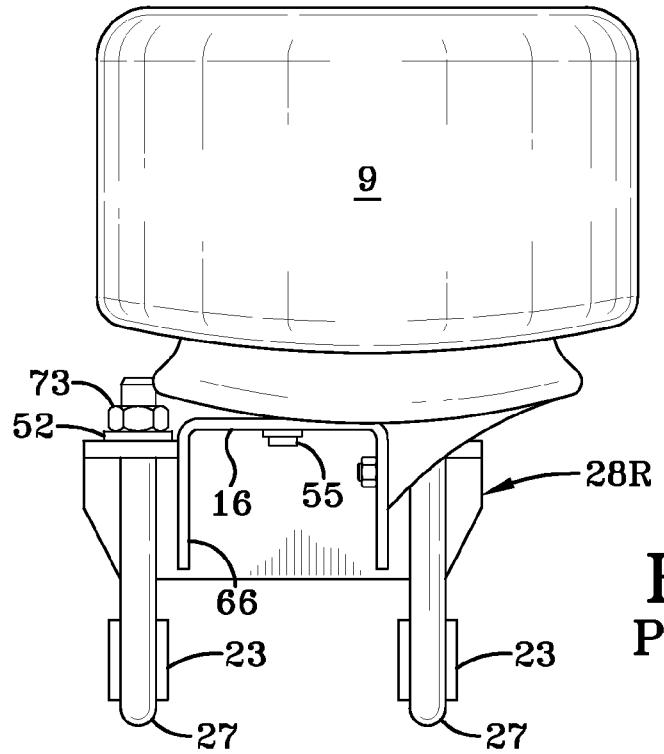
FIG. 3C is an end view taken along line 3C-3C in FIG. 1 of one of the pair of suspension assemblies.
Figure 4:
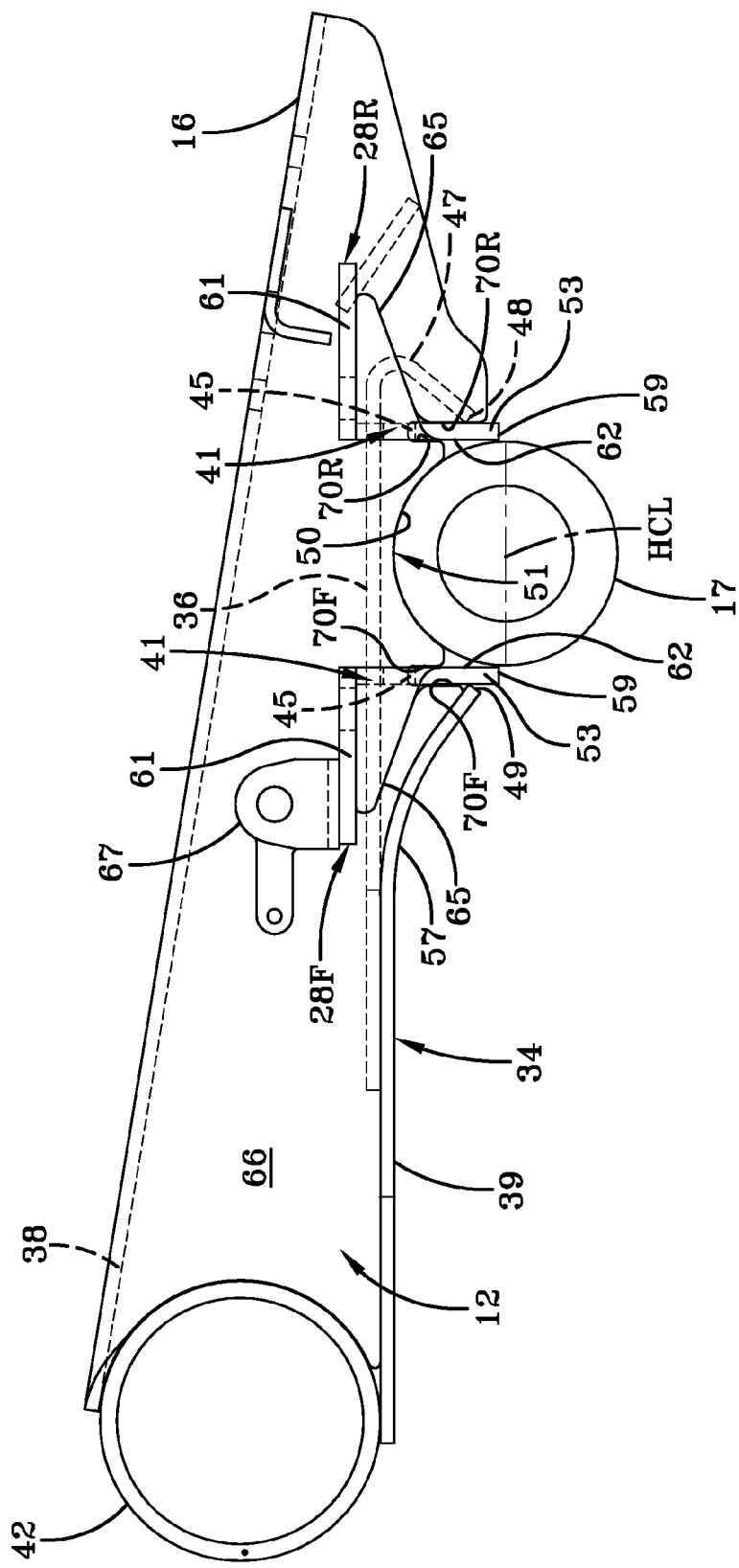
FIG. 4 is an enlarged isolated elevational view of portions of the beam and axle shown in FIG. 1, with hidden portions represented by broken lines.

With additional reference to FIGS. 3A-4, suspension assembly 11 includes a trailing arm or beam 12 which is a generally rigid metal box-like structure comprising a pair of transversely spaced vertically extending sidewalls 66, which are interconnected by horizontally extending top and first bottom plates 38 and 39, respectively. Sidewalls 66 and top plate 38 are formed as a one-piece structure having a generally inverted U-shape. Bottom plate 39 is welded to sidewalls 66 to complete the general structure of beam 12. A more detailed description of beam 12 is set forth below.

The front end of beam 12 includes a bushing assembly 40 (FIG. 3A) of a type which is well known in the heavy-duty axle/suspension system art. The bushing assembly includes a mounting tube 42 formed of robust steel and an elastomeric bushing 44 press fit into the tube. The bushing 44 is molded about and adhesively attached to a central metal sleeve 46 formed with a continuous opening 31. Sleeve 46 passes completely through bushing 44 and extends outwardly from the sidewalls thereof to facilitate pivotal mounting of beam 12 on hanger 18, which will be described in greater detail hereinbelow. As is well known in the art, the durometer of elastomeric bushing 44 can be varied depending on the application and the bushing deflection properties desired. To generally achieve a softer ride in the vertical direction and a stiffer ride in the fore-aft direction, bushing 44 is formed with a pair of vertically-spaced voids 43 in each of its sidewalls.

A platform 16 extends from the rear end of trailing beam 12 for supporting a conventional bellows-type air spring 9, which extends between and is attached to platform 16 and main member 6 (FIG. 1). A shock absorber 7 also is attached to and extends between beam 12 and main member 6 at selected locations to complete the major components of suspension assembly 11. An axle 17 extends between and is rigidly connected to the rear end of each beam 12 by front and rear three-pass welds 90F, 90R, respectively (FIG. 4C), and by structural components including a pair of beam U-bolts 27, a front U-bolt bracket/axle seat 28F, a rear U-bolt bracket/axle seal 28R, and their associated hardware, as will be described in greater detail below.

Suspension assembly beam 12 is pivotally mounted on main member 6 of the vehicle (not shown) via frame hanger 18 which depends from and is secured to the main member by any conventional means such as welds. Frame hanger 18 typically is a generally box-like sturdy steel structure having a vertically extending front wall 21 and a top wall 37, which are each attached to and extend between a pair of vertically extending sidewalls 22 (FIGS. 1 and 2). A fastener assembly 15 includes a nut 26 fastened to a bolt 20 which passes through an eccentric washer 19 and a second washer 24, with the eccentric washer being located adjacent the outboard surface of outboard sidewall 22 of hanger 18 and the second washer being located adjacent the inboard surface of inboard sidewall 22 of the hanger, a pair of aligned openings (not shown) formed in hanger sidewalks 22, a pair of aligned openings formed in a pair of conventional spacer discs (not shown), and aligned continuous opening 31 of bushing sleeve 46. Each spacer disc (not shown) typically is formed of ultra-high molecular weight polyethylene, and is disposed about bushing mounting lube 42 between a respective one of hanger sidewalls 22 and bushing 44, to insulate against metal-to-metal contact between the mounting tube and the hanger sidewalls. Eccentric washer 19 provides a means for adjusting alignment of axle/suspension system 10.

With continuing reference to FIGS. 3A, 3B, 3C and 4, beam 12 generally comprises seven component parts including sidewalls 66, integral top plate 38, first bottom plate 39, a second bottom plate 36, and front and rear U-bolt brackets/axle seats 28F,28R, respectively, together with their associated hardware, set forth in greater detail below. As set forth above, opposing sidewalls 66 and top plate 38 form a one-piece generally inverted U-shaped member. This U-shaped member is formed by a stamping and/or bending process. First bottom plate 39 and second bottom plate 36 are secured together by welding along an adjacent interlace 35 to form a rigid beam bottom member 34. Beam bottom member 34 is rigidly secured to the open end of the U-shaped member, and along sidewalls 66 and, thus, opposite and spaced from top plate 38.

Figure 4A:
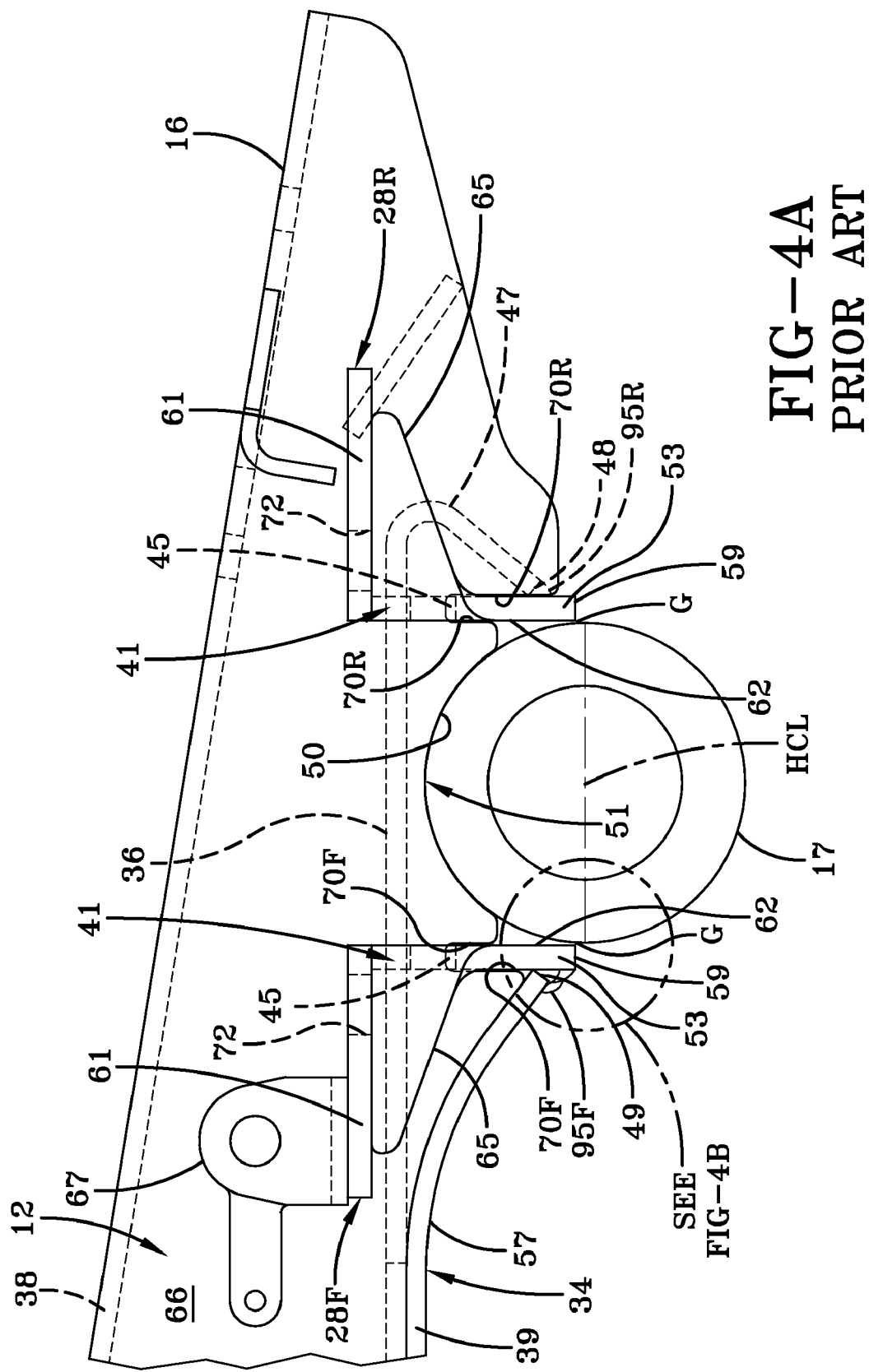
FIG. 4A is an enlarged fragmentary view of the beam and axle shown in FIG. 4, showing welds at each of the junctions between the front and rear U-bolt brackets/axle seats and the ends of the first and second bottom plates, respectively, of the beam, and also showing the gap between the front and rear U-bolt brackets/axle seats and the axle prior to completion of the assembly of the axle-to-beam connection.
Figure 4B:
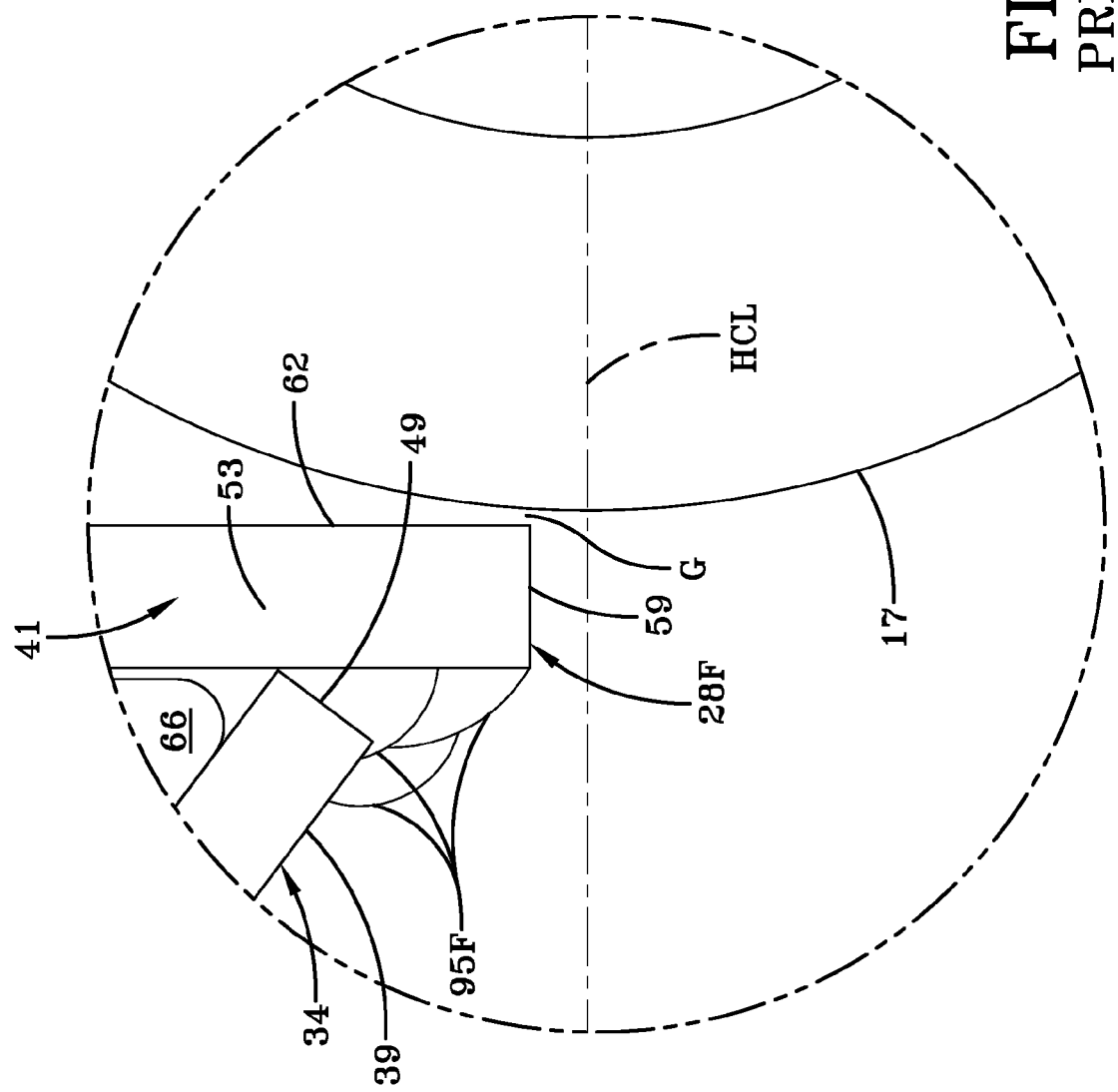
FIG. 4B is a greatly enlarged view taken from area 4B of FIG. 4A, showing a three-pass weld connecting the end of the first bottom plate of the beam to the front U-bolt bracket/axle seat, and also showing the gap between the front U-bolt bracket/axle seat and the front portion of the axle prior to completion of the assembly of the axle-to-beam connection.

Front U-bolt bracket/axle seat 28F nests in and is rigidly secured by welding in a pair of transversely spaced front slots 70F formed in opposing sidewalls 66 of beam 12 frontwardly of axle 17 (FIG. 4). Rear U-bolt bracket/axle seat 28R nests in and is rigidly secured by welding in a pair of transversely spaced rear slots 70R formed in opposing sidewalls 66 of beam 12 rearwardly of axle 17 (FIG. 4). An arch 50 (only one shown) is integrally formed in the lower edge of each of sidewalls 66 between front and rear slots 70F and 70R. Second bottom plate 36 is formed with a bend 47 adjacent an end 48 opposite from the bushing assembly end of the plate. First bottom plate 39 is also formed with a bend 57 adjacent an end 49 opposite from the bushing assembly end of the plate.

fuming now to FIGS. 4A and 4B, terminal bent end 48 of second bottom plate 36 contacts and is rigidly secured to rear U-bolt bracket/axle seat 28R by a rear weld 95R, while terminal bent end 49 of first bottom plate 39 contacts and is rigidly secured to front U-bolt bracket/axle seat 28F by a front three-pass weld 95F. As can be seen, by bending first bottom plate 39 and second bottom plate 36 in a manner so that ends 49 and 48, respectively, are oriented in the general direction of axle 17, an axle locus 51 (FIG. 1) is formed by arches 50 (only one shown) of beam sidewalls 66, front and rear U-bolt brackets/axle seals 28F,28R, a pair of U-bolts 27, a pair of U-bolt spacers 23 and ends 49 and 48 of first and second bottom plates 39 and 36, respectively. Axle locus 51 is also known or referred to generally in the heavy-duty vehicle art as an "axle seat".

As shown in FIG. 1, a shock absorber pivot plate 67 is secured to front U-bolt bracket/axle seat 28F by suitable means (not shown). Shock absorber 7 is fastened to shock absorber pivot plate 67 such that the shock absorber pivots relative to beam 12. A height control valve 81 is attached to hanger 18 and is operative connected to shock absorber pivot plate 67, via a lever 82 and a link 83. Air spring 9 is secured to main member 6 of the vehicle by threaded fastener connections 58 (FIG. 2) which are rigidly attached to the air spring, and which are threadably engaged by nuts 54. Air spring 9 is also secured to platform 16 by suitable fasteners 55 (FIG. 3C).

Turning now to FIGS. 4-4B, front U-bolt bracket/axle seat 28F is shown nested in transversely-spaced front slots 70F, and extends downwardly toward and adjacent to the front portion of axle 17. Rear U-bolt bracket/axle seat 28R is shown nested in transversely-spaced rear slots 70R, and extends downwardly toward and adjacent to the rear portion of axle 17. Because front and rear U-bolt brackets/axle seats 28F and 28R are generally identical to one another, for the sake of clarity only the front U-bolt bracket/axle seat located adjacent to the front portion of axle 17 will be described herein, with the understanding that the rear U-bolt bracket/axle seat mirrors the front U-bolt bracket/axle seat. Front U-bolt bracket/axle seat 28F includes a generally vertical interconnecting member 41, a horizontal member 61 and a strengthening web 65. Interconnecting member 41 includes an upper portion 45 and a lower portion 53. Interconnecting member 41 also includes a surface 62 that faces the front portion of axle 17. Vertical upper portion 45 of front U-bolt bracket/axle seat 28F nests in transversely-spaced front slots 70F. Lower portion 53 of interconnecting member 41 includes a terminal edge 59. Terminal edge 59 terminates above a horizontal centerline HCL of axle 17. Neither terminal edge 59 nor surface 62 of interconnecting member 41 contact axle 17 when the axle has been seated into axle locus 51 during assembly of the axle-to-beam connection. Rather, a gap G or space exists between axle 17 and interconnecting member 41, as best shown in FIGS. 4A and 4B.

Figure 4C:
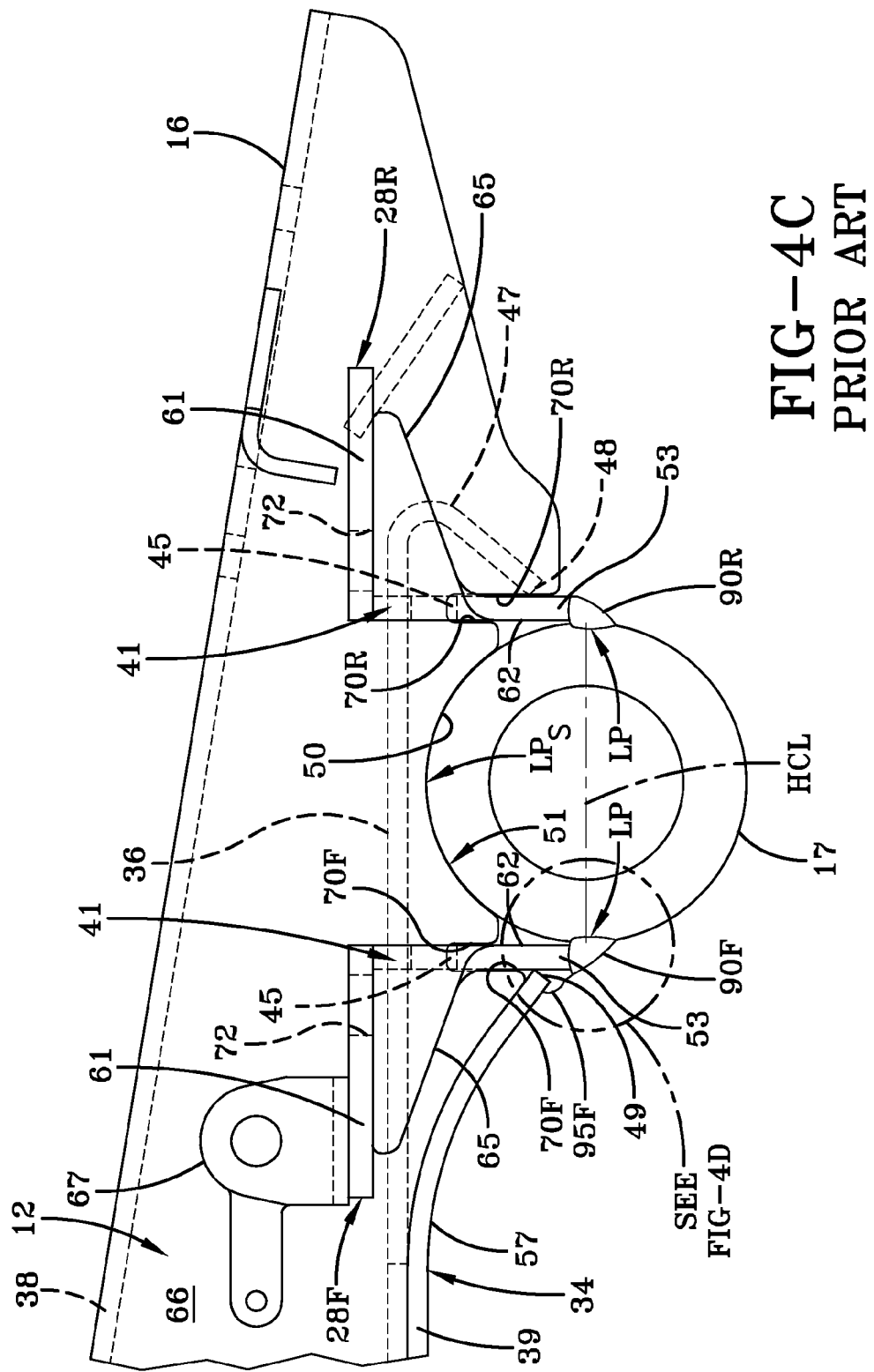
FIG. 4C is a view similar to FIG. 4A, showing the three-pass welds connecting the front and rear U-bolt brackets/axle seats to the front and rear portions of the axle, respectively, after completion of the assembly of the axle-to-beam connection.
Figure 4D:
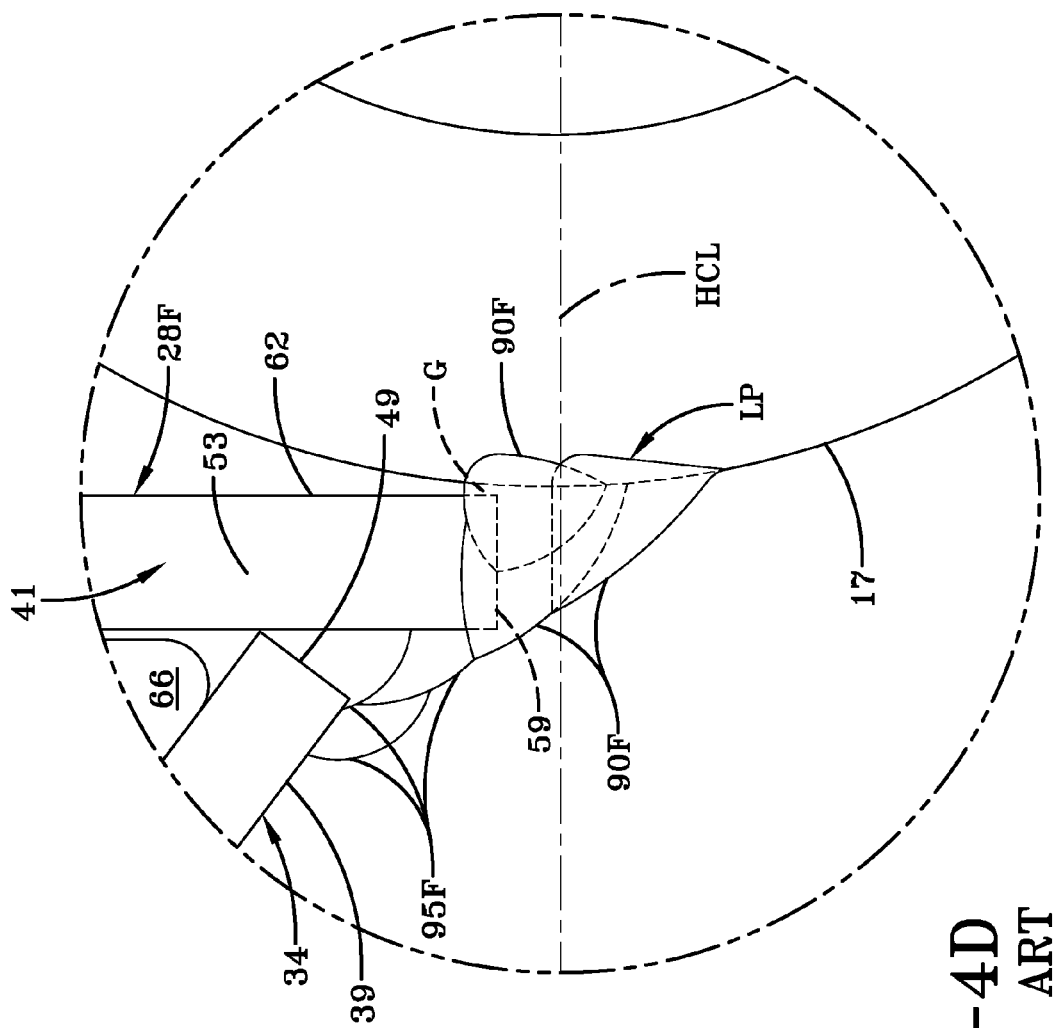
FIG. 4D is a greatly enlarged view taken from area 4D of FIG. 4C, showing the three-pass weld connecting the front U-bolt bracket/axle seat to the front portion of the axle after completion of the assembly of the axle-to-beam connection.

Turning now to FIGS. 4C and 4D, during assembly of the prior art axle-to-beam connection, axle 17 is seated in axle locus 51. A front three-pass weld 90F is laid along gap G between axle 17 and terminal edge 59 of front U-bolt bracket/axle seat 28F to fixedly attach the axle to the front U-bolt bracket/axle seal. Likewise, rear three-pass weld 90R is laid along gap G between axle 17 and terminal edge 59 of rear U-bolt bracket/axle seal 28R to fixedly attach the axle to the rear U-bolt bracket/axle seat. As the welds are laid along the respective gaps G between each terminal edge 59 and axle 17, a portion of the terminal edge is consumed. Because each terminal edge 59 is disposed above horizontal centerline HCL of axle 17 prior to completion of assembly, after a portion of the terminal edge is consumed during welding of the axle to the terminal edge, front and rear three-pass welds 90F,R are generally located above the horizontal centerline of the axle in gaps G when assembly is complete. Therefore, after assembly is completed, each of front and rear three-pass welds 90F and 90R in addition to arches 50 of beam 12 serve as the substantial first and second load paths LP and $LP_s$, respectively, for transfer of certain loads from axle 17 to front and rear U-bolt brackets/axle seals 28F and 28R, and to other components of beam 12 during operation of the vehicle. More specifically, during operation of the vehicle, a first load path LP exists that extends through axle 17, through front three-pass weld 90F, through terminal edge 59 of lower portion 53 of front U-bolt bracket/axle seat 28F, and to other components of beam 12. Likewise, during operation of the vehicle, a second first load path LP exists that extends through axle 17, through rear three-pass weld 90R, through terminal edge 59 of lower portion 53 of rear U-bolt bracket/axle seat 28R, and to other components of beam 12. A second load path LPS also exists and extends through axle 17 to arch 50 of beam 12 during operation of the vehicle.

Because the prior art axle-to-beam connection requires a pair of generally identical inboard and outboard connections in addition to the welds set forth above for each suspension assembly 11, for purposes of clarity only the inboard connection of the suspension assembly will be described with the understanding that an identical outboard connection also exists for the same suspension assembly. U-bolt spacer 23 (FIG. 1) is constructed such that it will contact an exposed lower portion of axle 17 and is disposed between the axle and U-bolt 27 to ensure a secure mating of the axle in locus 51. U-bolt 27 is placed around axle 17 (FIG. 1) and through a pair of openings 72 (FIG. 3A), each one of the openings being formed in the inboard portion of horizontal member 61 of front and rear U-bolt brackets/axle seats 28F, 28R, respectively. Each one of a pair of washers 52 (FIG. 3C) is disposed over a respective one of the pair of ends of U-bolt 27 and each one of a pair of nuts 73 is threadably engaged with a respective one of the pair of threaded ends of the U-bolt, and tightened. U-bolts 27 and U-bolt spacers 23 in conjunction with U-bolt brackets/axle seals 28F and 28R, washers 52 and nuts 73, together with front and rear three-pass welds 90F,R secure axle 17 into axle locus 51 to create a rigid axle-to-beam connection.

As set forth above, prior art axle-to-beam connections such as the one described immediately above, can suffer from potential less than optimal weld fatigue life and/or potential less than optimal durability of the axle at or near the axle-to-beam connection during operation of the vehicle. This is because front and rear three-pass welds 90F,R are laid along the gaps G between axle 17 and terminal edges 59 of vertical portions 41 of front and rear U-bolt bracket/axle seat 28F and 28R, respectively. These welds in gaps G result in certain loads from the axle being imparted during operation of the vehicle into beam 12 substantially through front and rear three-pass welds 90F,R, respectively, that connect the axle to front and rear U-bolt brackets/axle seats 28F,R. The axle-to-beam connection of the present invention overcomes the problems associated with the prior art axle-to-beam connection and is described in detail below.

Figure 5:
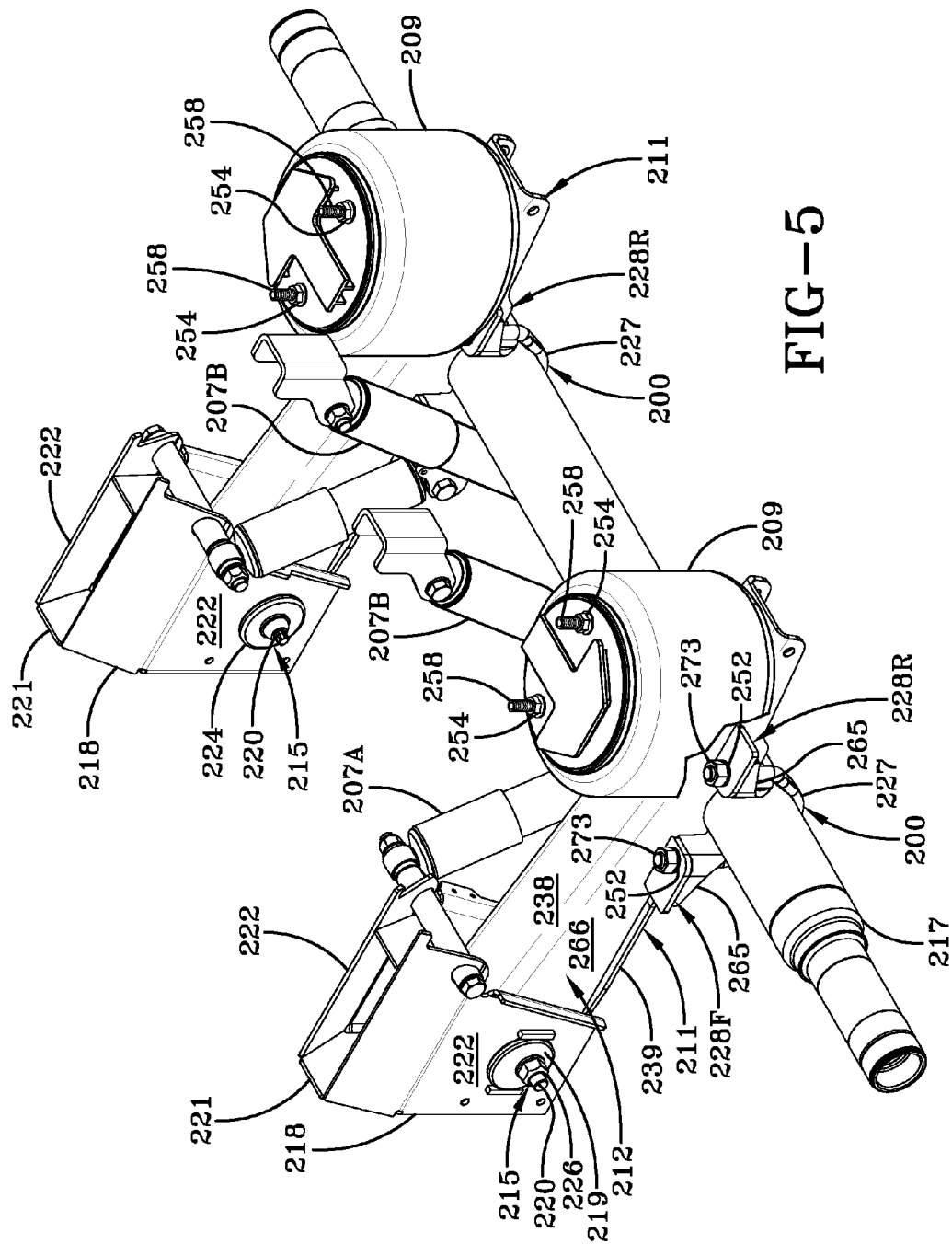
FIG. 5 is a top rear driver-side perspective view of an axle/suspension system incorporating a pair of preferred embodiment axle-to-beam connections of the present invention.
Figure 6:
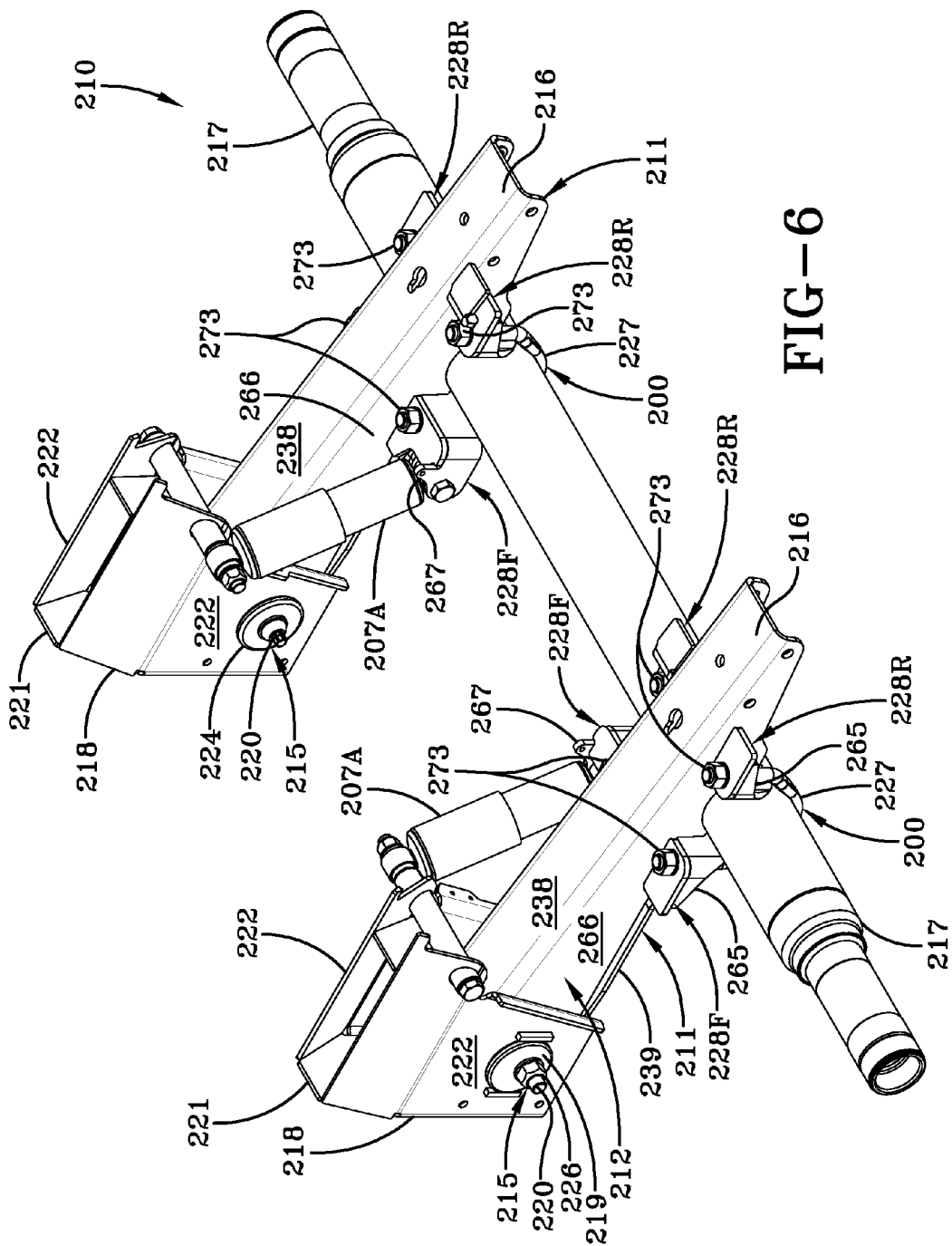
FIG. 6 is a view similar to FIG. 5 but with the air springs and two of the shock absorbers removed.
Figure 7:
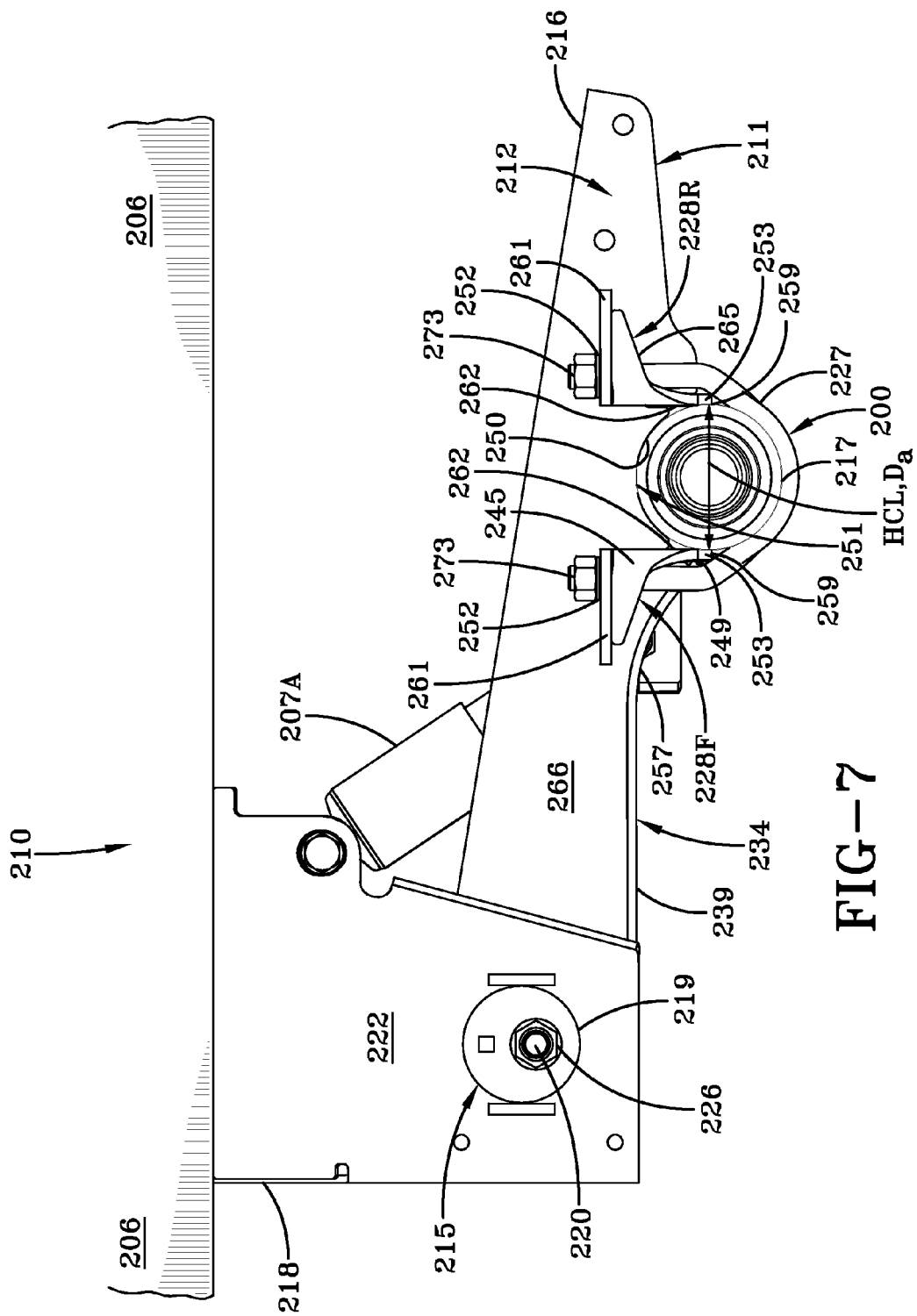
FIG. 7 is a fragmentary elevational view of the preferred embodiment axle-to-beam connection of the present invention mounted on a frame, showing the interference or press fit of the axle into the front and rear U-bolt brackets/axle seals and also showing the outboard U-bolt of the driver's side suspension assembly.

A preferred embodiment of the axle-to-beam connection of the present invention is shown generally at 200 in FIGS. 5-7, is utilized in conjunction with top-mount/overslung beams 212 of an axle/suspension system 210, and now will be described below.

Axle-to-beam connection 200 is similar in certain respects to the prior art axle-to-beam connection described hereinabove in connection with axle/suspension system 10, but is different in other aspects. As set forth above, axle-to-beam connection 200 is preferably used in connection with top-mount/overslung beam 212, but could also be utilized in conjunction with bottom-mount/underslung beams without changing the overall concept or operation of the present invention.

Air-ride trailing arm rigid overslung/top-mount beam-type axle/suspension system is indicated generally by reference numeral 210 and is shown in FIG. 5 incorporating axle-to-beam connection 200 of the present invention. Inasmuch as axle/suspension system 210 comprises an identical pair of suspension assemblies 211 mounted on a pair of transversely spaced hangers 218 depending from a pair of frame main members 206 (FIG. 7) of a heavy duty vehicle (not shown), only one of the suspension assemblies will be described herein.

Suspension assembly 211 includes Hailing arm or beam 212 which is a generally rigid metal box-like structure comprising a pair of transversely spaced vertically extending sidewalls 266, which are interconnected by horizontally extending top and first bottom plates 238 and 239, respectively. Sidewalls 266 and top plate 238 are formed as a one-piece structure having a generally inverted U-shape. Bottom plate 239 is welded to sidewalls 266 to complete the general structure of beam 212. A more detailed description of beam 212 is set forth below.

Figure 8:
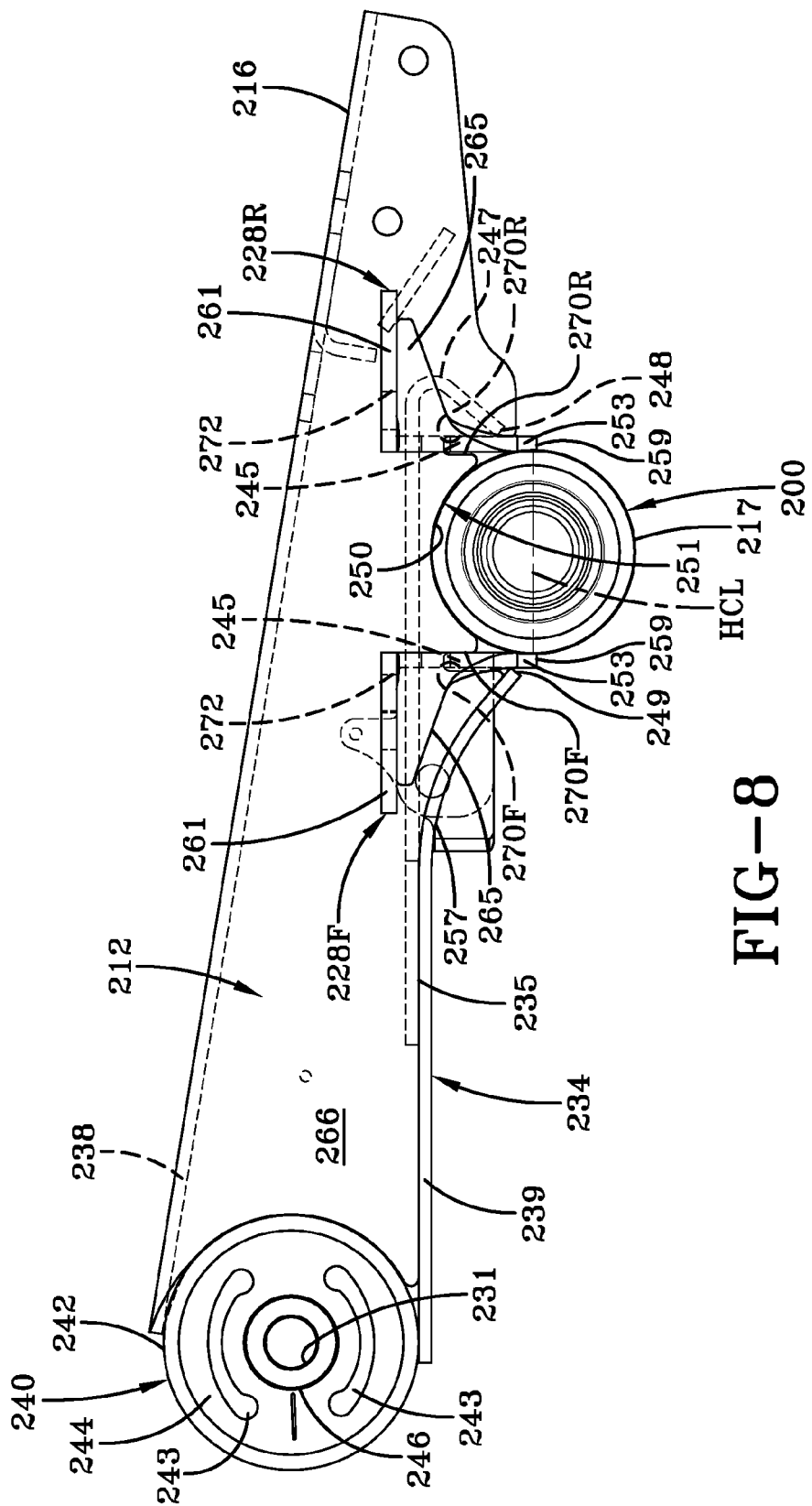
FIG. 8 is an enlarged elevational view similar to FIG. 7, but with the U-bolt, hanger and frame not shown, and with hidden portions represented by broken lines, showing the location of the front and rear U-bolt brackets/axle seats with respect to the horizontal centerline of the axle.

Turning now to FIG. 8, the front end of beam 212 includes a bushing assembly 240 of a type which is well known in the heavy-duty axle/suspension system art. The bushing assembly includes a mounting tube 242 formed of robust steel and an elastomeric bushing 244 press fit into the tube. Bushing 244 is molded about and adhesively attached to a central metal sleeve 246 formed with a continuous opening 231. Sleeve 246 passes completely through bushing 244 and extends outwardly from the sidewalls thereof to facilitate pivotal mounting of beam 212 on hanger 218 (FIGS. 5 and 7), which will be described in greater detail hereinbelow. As is well known in the art, the durometer of elastomeric bushing 244 can be varied depending on the application and the bushing deflection properties desired. To generally achieve a softer ride in the vertical direction and a stiffer ride in the fore-aft direction, bushing 244 is formed with a pair of vertically-spaced voids 243 in each of its sidewalls.

With additional reference to FIGS. 6-7, a platform 216 extends from the rear end of trailing beam 212 for supporting a conventional bellows-type air spring 209 (FIG. 5), which extends between and is attached to platform 216 and frame main member 206 of the vehicle. First and second shock absorbers 207A,B, respectively, (FIG. 5) are attached to beam 212, in a manner well known to those skilled in the art. First shock absorber 207A is also attached to hanger 218 in a manner well known to those skilled in the art. Second shock absorber 207B is also attached to the frame of the vehicle (not shown) in a manner well known to those having skill in the art, to complete the major components of suspension assembly 211. An axle 217 extends between and is rigidly connected to the rear end of each beam 212 by welding and by structural components including a pair of beam U-bolts 227, a front U-bolt bracket/axle seat 228F, a rear U-bolt bracket/axle seat 228R, and their associated hardware, as will be described in greater detail below.

With continuing reference to FIGS. 5-7, suspension assembly beam 212 is pivotally mounted on main member 206 of the vehicle via frame hanger 218 (FIG. 7) which depends from and is secured to the main member by any conventional means such as welds. Frame hanger 218 typically is a generally box-like sturdy steel structure having a vertically extending from wall 221 (FIG. 6) attached to and extending between a pair of vertically extending sidewalls 222. A fastener assembly 215 includes a bolt 220 which passes through an eccentric washer 219 and a second washer 224, with the eccentric washer being located adjacent the outboard surface of outboard sidewall 222 of hanger 218 and second washer 224 being located adjacent the inboard surface of inboard sidewall 222 of the hanger, a pair of aligned openings (not shown) formed in hanger sidewalls 222, a pair of aligned openings formed in a pair of conventional spacer discs (not shown), and aligned continuous opening 231 of bushing sleeve 246. A nut 226 is threadably engaged on the outboard end of bolt 220 to complete fastener assembly 215. Each spacer disc typically is formed of ultra-high molecular weight polyethylene, and is disposed about bushing mounting tube 242 between a respective one of hanger sidewalls 222 and bushing 244, to insulate against metal-to-metal contact between the mounting tube and the hanger sidewalls. Eccentric washer 219 provides a means for adjusting alignment of axle/suspension system 210.

Turning now 10 FIG. 8, beam 212 generally comprises seven component parts, including sidewalls 266, integral top plate 238, first bottom plate 239, a second bottom plate 236, and front and rear U-bolt brackets/axle seats 228F,228R, respectively, together with their associated hardware, set forth in greater detail below. As set forth above, opposing sidewalls 266 and top plate 238 form a one-piece generally inverted U-shaped member. This U-shaped member is formed by a stamping and/or bending process. First bottom plate 239 and second bottom plate 236 are secured together by welding along an adjacent interface 235 to form a rigid beam bottom member 234. Beam bottom member 234 is rigidly secured to the open end of the U-shaped member along sidewalls 266 and, thus, opposite and spaced from top plate 238.

Figure 9:
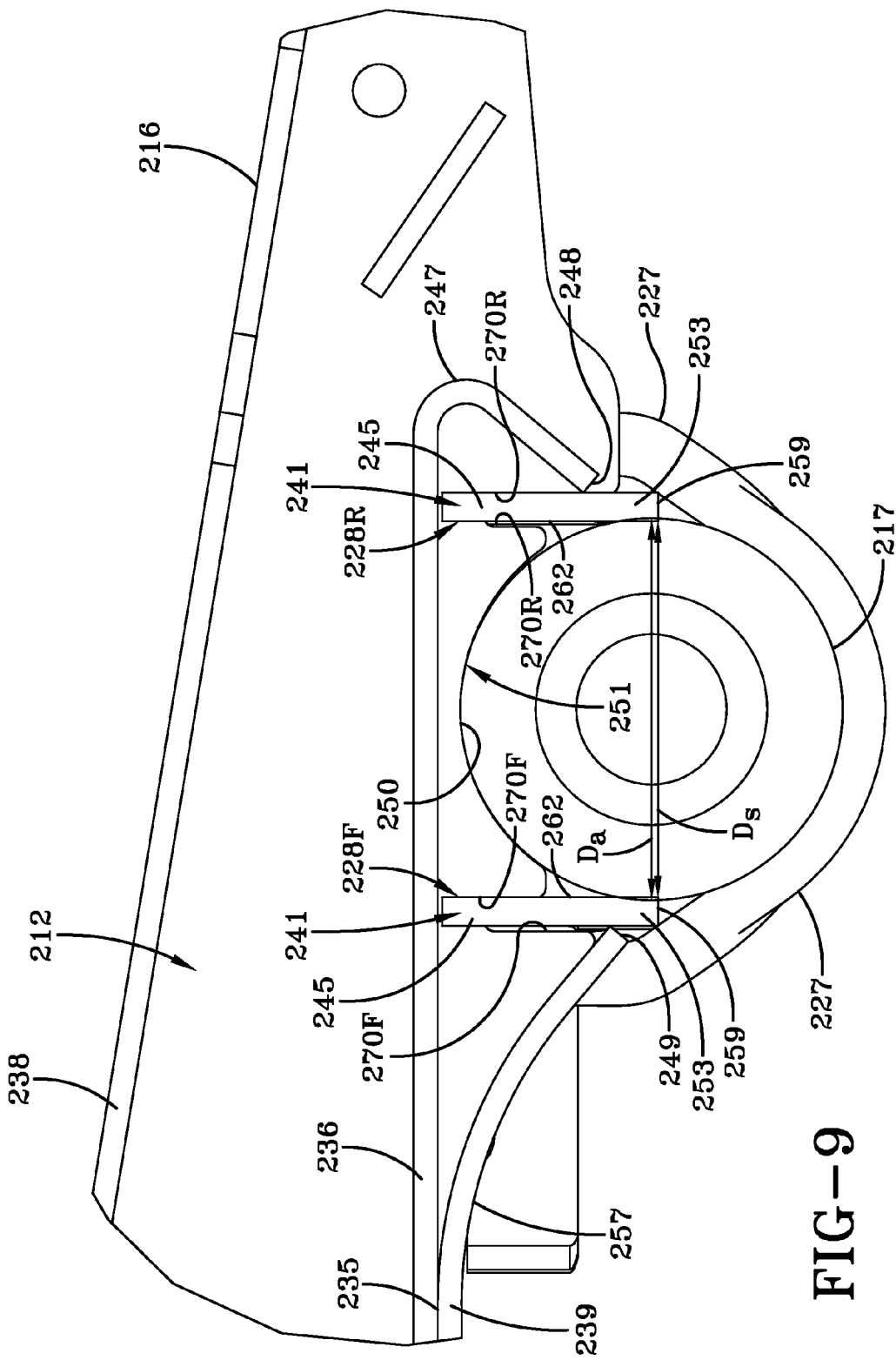
FIG. 9 is greatly enlarged fragmentary elevational view of a portion of the beam shown in FIG. 8, showing the distance between the interconnecting members of the front and rear U-bolt brackets/axle seats and the interference lit of the axle between interconnecting members of the front and rear U-bolt brackets/axle seats, and also showing the inboard U-bolt.

With additional reference to FIGS. 9 and 9A, front U-bolt bracket/axle seat 228F nests in and is rigidly secured by welding in a pair of transversely spaced front slots 270F formed in opposing sidewalls 266 of beam 212 frontwardly of axle 217. Rear U-bolt bracket/axle seal 228R nests in and is rigidly secured by welding in a pair of transversely spaced rear slots 270R formed in opposing sidewalls 266 of beam 212 rearwardly of axle 217. An arch 250 (only one shown) is integrally formed in the lower edge of each of sidewalls 266 between front and rear slots 270F and 270R. Second bottom plate 236 is formed with a bend 247 adjacent an end 248 opposite from the bushing assembly end of the plate. First bottom plate 239 is also formed with a bend 257 adjacent an end 249 opposite from the bushing assembly end of the plate. Terminal bent end 248 of second bottom plate 236 contacts and is rigidly secured to rear U-bolt bracket/axle seat 228R by a rear weld 295R, while terminal bent end 249 of first bottom plate 239 contacts and is rigidly secured to front U-bolt bracket/axle seat 228F by a front three-pass weld 295F. As can be seen, by bending first bottom plate 239 and second bottom plate 236 in a manner so that ends 249 and 248, respectively, are oriented in the general direction of axle 217, an axle locus 251 is formed by arches 250 (only one shown) of sidewalls 266, front and rear U-bolt brackets/axle seats 228F,228R. U-bolts 227 and ends 249 and 248 of first and second bottom plates 239 and 236, respectively. Axle locus 251 is also known or referred to generally in the heavy-duty vehicle art as an "axle seat".

As shown in FIG. 6, a shock absorber pivot plate 267 is secured to the inboard side of front U-bolt bracket/axle seat 228F by suitable means (not shown). First and second shock absorbers 207A,B are fastened to shock absorber pivot plate 267 such that the shock absorbers pivot relative to beam 212. Air spring 209 is secured to vehicle frame main member 206 of the vehicle (not shown) by threaded fastener connections 258 (FIG. 5) which are rigidly attached to the air spring, and which are threadably engaged by nuts 254. Air spring 209 is also secured to beam platform 216 by suitable fasteners (not shown).

Figure 9B:
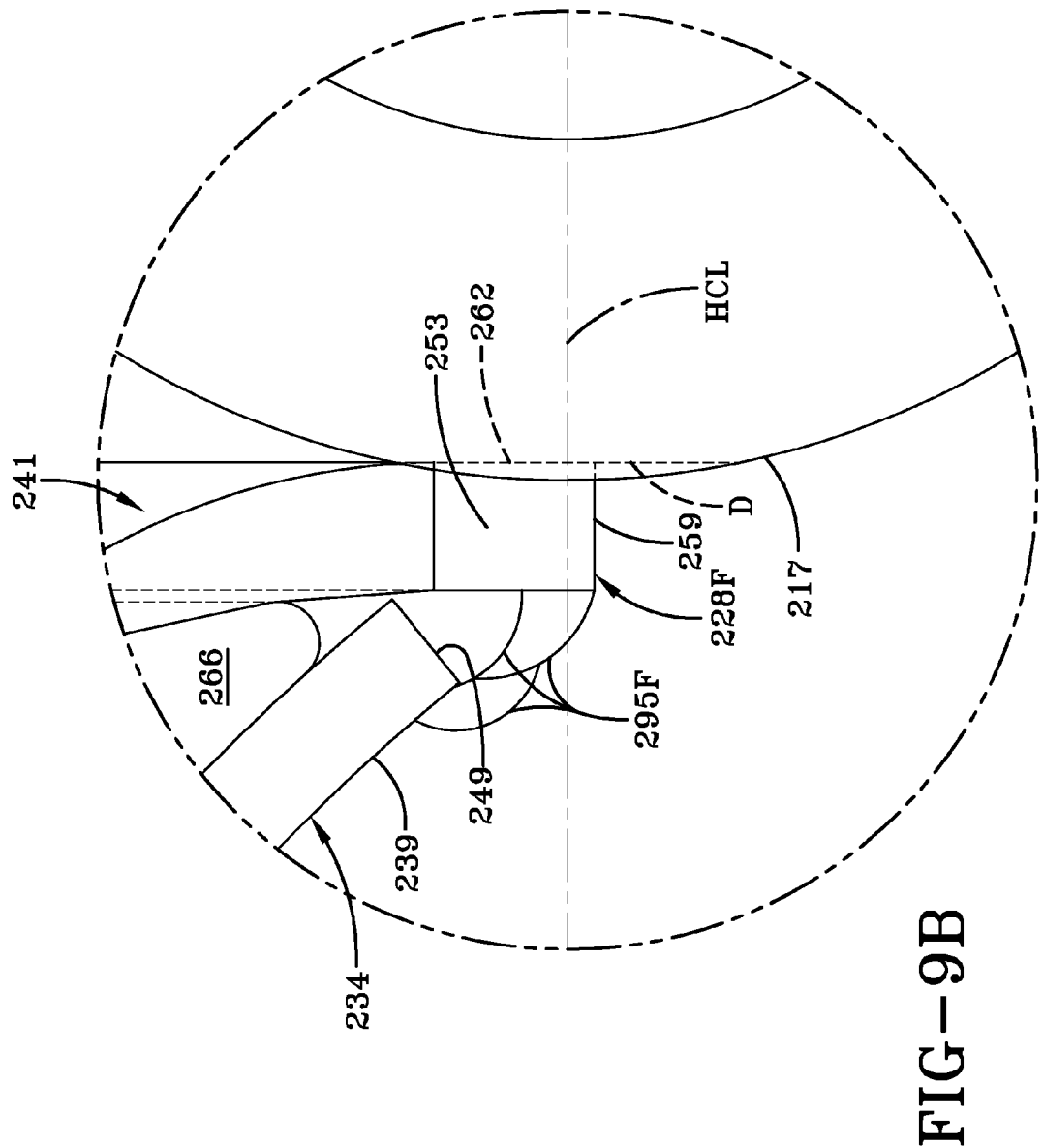
FIG. 9B is a greatly enlarged view taken from area 9B of FIG. 9A, and showing the interference fit of the front U-bolt bracket/axle seal and the front portion of the axle, including the slight deformation of the axle, and also showing the three-pass weld connecting the first bottom plate of the beam to the front U-bolt-bracket/axle seat.

With additional reference to FIG. 9, 9A and 9B, front U-bolt bracket/axle seat 228F is shown nested in transversely spaced front slots 270F, and extends downwardly toward and adjacent to the front portion of axle 217. Rear U-bolt bracket/axle seat 228R is shown nested in transversely spaced rear slots 270R, and extends downwardly toward and adjacent to the rear portion of axle 17. Because front and rear U-bolt brackets/axle seats 228F and 228R are generally identical to one another, for the sake of clarity only the front U-bolt bracket/axle seal located adjacent to the front portion of axle 17 will be described herein, with the understanding that identical rear U-bolt bracket/axle seat mirrors the front U-bolt bracket/axle seat. Front U-bolt bracket/axle seal 228F includes a generally vertical interconnecting member 241, a generally horizontal member 261 and a strengthening web 265. Interconnecting member 241 includes an upper portion 245 and a lower portion 253. Interconnecting member 241 also includes a surface 262 that faces the front portion of axle 217. Vertical upper portion 245 of front U-bolt bracket/axle seal 228F nests in front slots 270F and is rigidly attached thereto, preferably by welding. Lower portion 253 of interconnecting member 241 includes a terminal edge 259.

In accordance with an important feature of the present invention, terminal edge 259 of front U-bolt bracket/axle seat 228F extends generally downwardly adjacent to the front portion of axle 217. Preferably, terminal edge 259 terminates at or beyond a horizontal centerline HCL of axle 217 (FIGS. 9A and 9B). It is understood that the centerline of the axle is shown oriented horizontally, but other angles or orientations of the centerline are contemplated. In other words, axle locus 251, which is created at least in part by arches 250 and front and rear U-bolt brackets/axle seats 228F,R, surrounds at least 180° of axle 217 and preferably more than 180°. For example, front and rear U-bolt brackets/axle seats 228F and 228R could be rotated around axle 217 to any angle so long as terminal edges 259 of the front and rear U-bolt brackets/axle seats terminate at or beyond a given centerline of the axle, irrespective of the angle of the centerline, horizontal, vertical or otherwise.

In accordance with another important feature of the present invention, front and rear slots 270F and 270R are spaced from one another so that when upper portions 245 of interconnecting members 241 of front and rear U-bolt brackets/axle seats 228F and 228R are nested in each of the slots as set forth above, surfaces 262 of the interconnecting members of the front and rear U-bolt brackets/axle seats define a distance $D_s$ (FIG. 9A) between them that is equivalent to or less than an outside diameter $D_a$ of axle 217 (FIG. 9). In the preferred embodiment axle-to-beam connection 200 of the present invention, distance $D_s$ is less than outside diameter $D_a$ prior to assembly of the axle-to-beam connection. When distance $D_s$ is less than outside diameter $D_a$, an interference lit and al least point and/or preferably, line contact is assured between the front and rear portions of axle 217 and surfaces 262 adjacent terminal edges 259 of front and rear U-bolt brackets/axle seals 228F and 228R after assembly of axle-to-beam connection 200. This point and/or line contact between surfaces 262 of interconnecting members 241 of front and rear U-bolt brackets/axle seats 228F,228R, respectively, and the front and rear portions of axle 217, creates at least a slight deformation D (FIG. 11) of the axle on each of its front and rear portions and results in a compressive preload between the axle and interconnecting member surfaces 262 of the front and rear U-bolt brackets/axle seals adjacent interconnecting member lower portion 253. A compressive preload is also created between axle 217 and the front portions of arches 250 of sidewalls 266 of beam 212. It should be noted that axle 217 must have sufficient rigidity to Withstand the generation of the compressive preload without plastic deformation of the axle. Moreover, axle 217 must be sufficiently rigid in the localized zone of axle-to-beam connection 200 so that elastic deformation occurs during operation of the vehicle. FIG. 9 shows a comparison of distance $D_s$ between surfaces 262 of front and rear U-bolt brackets/axle seats 228F and 228R and outer diameter $D_a$ of axle 217. More specifically, FIGS. 7-11 show the preferred axle-to-beam connection 200 of the present invention following assembly whereby distance $D_s$ is less than distance $D_a$ prior to assembly, which creates a point and/or preferably line contact interference fit between axle 217 and surfaces 262 of lower portion 253 of interconnecting member 241 of front and rear U-bolt brackets/axle seats 228F and 228R near terminal edge 259 and preferably at or near horizontal centerline HCL of the axle. When distance $D_s$ is equal to outside diameter $D_a$ prior to assembly, contact is created between the from and rear portions of axle 217 and surfaces 262 adjacent terminal edges 259 of front and rear U-bolt bracket/axle seats 228F and 228R following assembly of axle-to-beam connection 200. It should be understood that axle-to-beam connection 200 of the present invention could be utilized with either merely contact or an interference fit, as described above, between axle 217 and surfaces 262 of lower portion 253 of interconnecting member 241 of front and rear U-bolt brackets/axle seats 228F and 228R. For purposes of the description of the preferred embodiment herein, only the interference fit will be described with the understanding that a contact fit could also be utilized without changing the overall concept or operation of the present invention.

In accordance with yet another important feature of the axle-to-beam connection of the present invention, axle 217 is fixedly attached to front U-bolt bracket/axle seat 228F by a front three-pass weld 290F (FIGS. 10 and 11), which is laid along the junction between the axle and terminal edge 259 of vertical portion 241 of the front U-bolt bracket/axle seat at or preferably just beyond horizontal centerline HCL of the axle, which is the least active portion of the axle with respect to reacting vertical loads during operation of the vehicle, and which is the location of the residual compressive, stress field on the axle created by the point and/or line contact interference lit of the axle into the front and rear U-bolt brackets/axle seats. Axle 217 is fixedly attached to rear U-bolt bracket/axle seat 228R by a rear three-pass weld 290R, which is laid along the junction between the axle and terminal edge 259 of vertical portion 241 of the rear U-bolt bracket/axle seat also at or preferably just beyond horizontal centerline HCL of the axle, and which is the location of the residual compressive stress field on the axle created by the point and/or line contact interference fit of the axle into the front and rear U-bolt brackets/axle seats. It should be understood that horizontal centerline HCL of axle 217 is shown oriented horizontally with front and rear three-pass welds 290F,R placed at the junction of terminal edges 259 of front and rear U-bolt brackets/axle seals 228F and 228R and the front and rear portions of the axle at or adjacent to the horizontal centerline of the axle, however, other configurations are contemplated. For example, interconnecting members 241 of front and rear U-bolt brackets/axle seats 228F and 228R could be angled with respect to one another and/or rotated around axle 217 to any angle so long as terminal edges 259 of the front and rear U-bolt brackets/axle seats terminate at or beyond a given centerline of the axle, irrespective of the angle of the centerline, horizontal, vertical or otherwise, with front and rear three-pass welds laid at or near the centerline where the residual compressive stress field is created on the axle by the front and rear U-bolt brackets/axle seals.

Turning now to FIGS. 7 and 8, axle-to-beam connection 200 of the present invention requires a pair of generally identical inboard and outboard connections for each suspension assembly 211. For purposes of clarity, only the inboard connection of the suspension assembly will be described with the understanding that an identical outboard connection also exists for the same suspension assembly. U-bolt 227 is placed around axle 217 and through a pair of openings 272, each one of the openings being formed in the inboard side of horizontal member 261 of a respective one of front and rear U-bolt brackets/axle seats 228F,228R. Each one of a pair of washers 252 (FIG. 7) is disposed over a respective one of the pair of ends of U-bolt 227 and each one of a pair of nuts 273 is threadably engaged with a respective one of the pair of threaded ends of the U-bolt, and tightened to secure the connection of axle 217 into axle locus 251 of beam 212 to create a rigid axle-to-beam connection.

Figure 10:
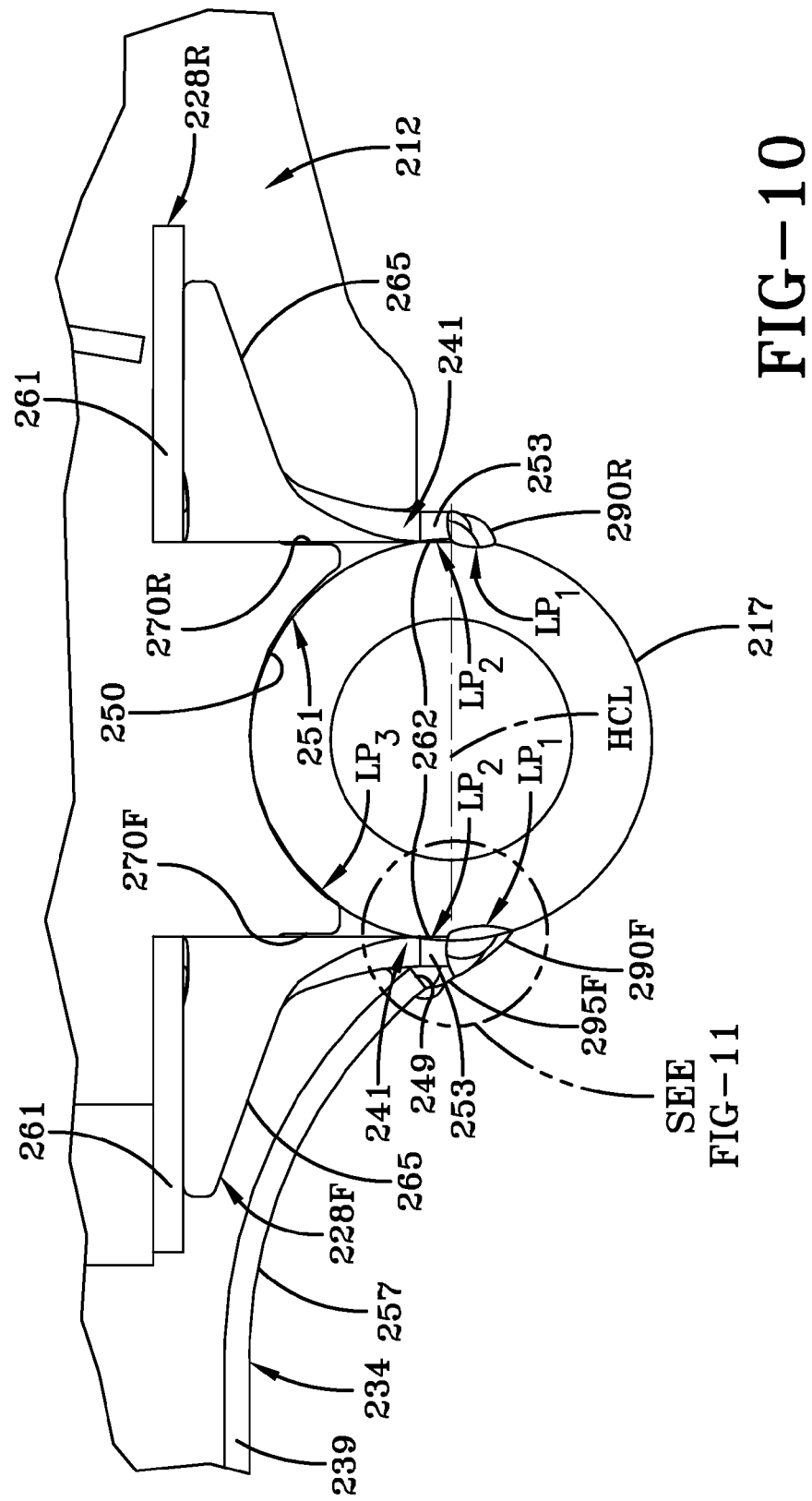
FIG. 10 is a fragmentary elevational view of the axle-to-beam connection shown in FIG. 9A, but showing the three-pass weld at each of the junctions between the front and rear portions of the axle and the front and rear U-bolt brackets/axle seats, respectively, following completion of the assembly of the axle-to-beam connection.
Figure 11:
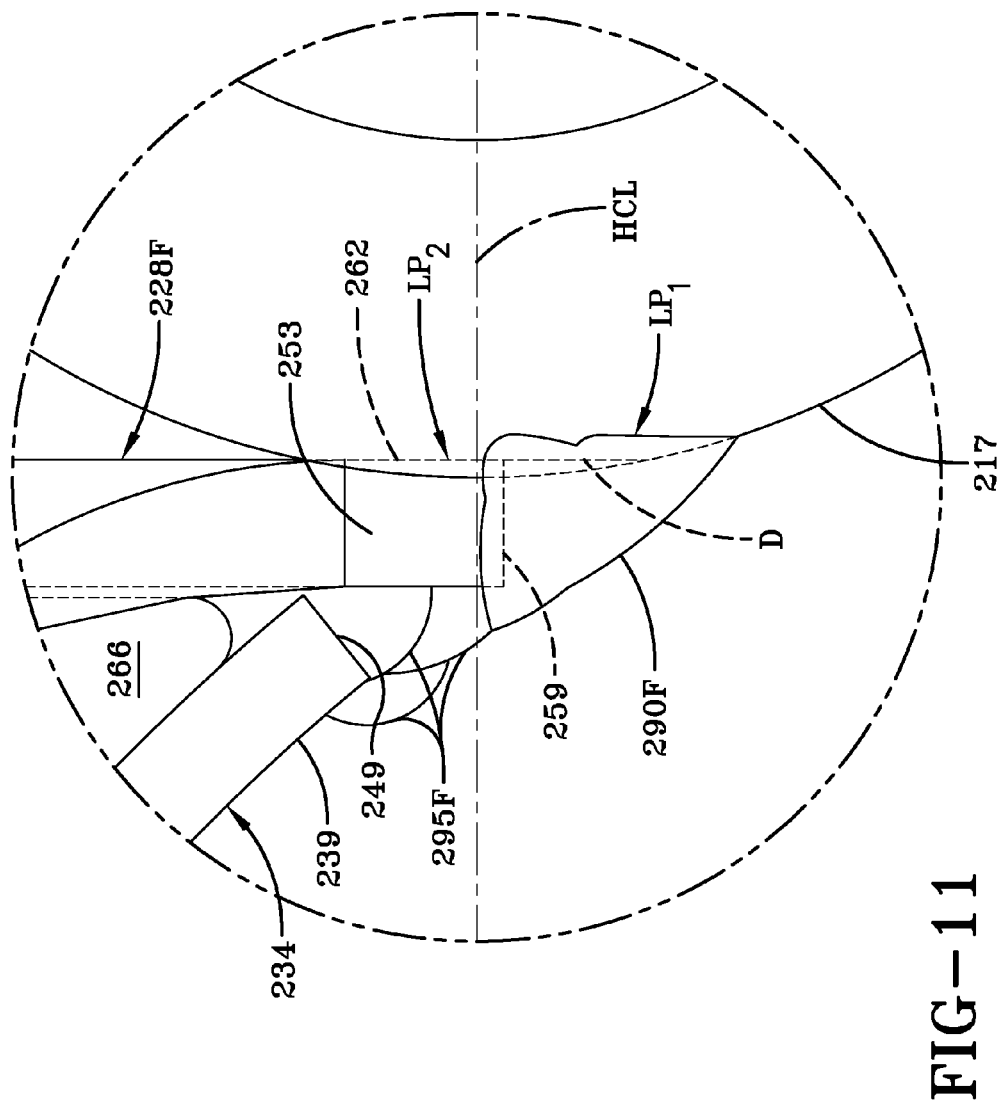
FIG. 11 is a greatly enlarged view taken from area 11 of FIG. 10, showing the three-pass weld connecting the first bottom plate of the beam to the front U-bolt bracket/axle seat, showing the interference fit of the front portion of the axle with the front U-bolt bracket/axle seat, and also showing the three-pass weld fixedly attaching the front portion of the axle to the front U-bolt bracket/axle seat.

As set forth above, axle-to-beam connection 200 of the present invention overcomes the problems associated with prior art axle-to-beam connections which include potential less than optimal weld fatigue life of the welds between axle 17 and terminal edges 59 of interconnecting members 41 of front and rear U-bolt brackets/axle seats 28F and 28R, and potential less than optimal durability of the axle at or near the axle-to-beam connection. This improvement is accomplished by disposing terminal edges 259 of interconnecting members 241 of from and rear U-bolt brackets/axle seats 228F and 228R at a point near or beyond horizontal centerline HCL of axle 217. This assures that when a portion of terminal edges 259 is consumed during placement of front and rear welds 290F and 290R at the junctions between axle 217 and the terminal edges, that the weld is located near or preferably at horizontal centerline HCL of the axle and within the residual compressive stress field on the axle created by the gap-free point and/or line contact interference lit of front and rear U-bolt brackets/axle seats 228F,R during assembly of axle-to-beam connection 200. This assures that certain loads acting on axle-to-beam connection 200 of the present invention during operation of the vehicle are shared between interconnecting members 241 of front and rear U-bolt brackets/axle seals 228F and 228R and front and rear three-pass welds 290F,R which are laid along the junctions between axle 217 and terminal edges 259 of the front and rear U-bolt brackets/axle seats. More specifically, during operation of the vehicle, a load path $LP_1$ exists that extends through axle 217, through front three-pass weld 290F, through terminal edge 259 of lower portion 253 of front U-bolt bracket/axle seat 228F, and to other components of beam 212 (FIG. 10). Likewise, during operation of the vehicle, a second load path $LP_1$ also exists that extends through axle 217, through rear three-pass weld 290R, through terminal edge 259 of lower portion 253 of rear U-bolt bracket/axle seat 228R, and to other components of beam 212. In addition, during operation of the vehicle, a load path $LP_2$ exists that extends through axle 217, through interconnecting member surface 262 of adjacent vertical lower portion 253 of front U-bolt bracket/axle seat 228F, and to other components of beam 212. Likewise, during operation of the vehicle, a second load path $LP_1$ also exists that extends through axle 217, through interconnecting member surface 262 of adjacent vertical lower portion 253 of rear U-bolt bracket/axle seat 228R, and to other components of beam 212. Furthermore, during operation of the vehicle a load path $LP_3$ exists that extends through axle 217, and into the front portions of arches 250 of sidewalls 266 of beam 212.

Axle-to-beam connection 200 of the present invention increases weld fatigue life at the axle-to-beam connection and also increase axle durability at or near the axle-to-beam connection by providing a structure whereby certain loads imparted on the axle-to-beam connection during operation of the vehicle are shared between front and rear U-bolt brackets/axle seats 228F,R, front and rear three-pass welds 290F,R and the front portions of arches 250 of sidewalls 266 of beam 212 as specifically set forth hereinabove and shown in the drawings of the present invention. Moreover, because front and rear welds 290F,R are laid on the residual compressive stress Held on the axle created by the gap-free interference fit of the axle between front and rear U-bolt brackets/axle seats 228F, R, the welds will have an increased fatigue life resulting in a longer life axle-to-beam connection. Therefore, axle-to-beam connection 200 of the present invention increases weld fatigue life, increases durability of axle 217 at or near the axle-to-beam connection and reacts loads better than known prior art axle-to-beam connections.

It is contemplated that preferred embodiment axle-to-beam connection 200 of the present invention could be utilized on tractor-trailers or heavy-duty vehicles having one or more than one axle without changing the overall concept of the present invention. It is preferable that axle-to-beam connection 200 of the present invention is formed by assembling beam 212 and front and rear U-bolt brackets/axle seats 228F and 228R so that distance $D_s$ between surfaces 262 of interconnecting members 241 is equal to or less than outside diameter $D_a$ of axle 217, so that the axle must be forced, by any suitable process known to those of ordinary skill in the art, into axle locus 251 between the surfaces of the front and rear U-bolt brackets/axle seats, thereby creating point and/or preferably line contact between the axle and the opposing surfaces of the interconnecting members of the front and rear U-bolt brackets/axle seats. It is also contemplated that the compressive preload between axle 217 and the front portions of arches 250 of sidewalls 266 of beam 212, could be located at other points along the length of the arches, such as the top or rear portions, without changing the overall concept or operation of the present invention. It is further contemplated that axle-to-beam connection 200 of the present invention could be formed utilizing one or more shims placed between axle 217 and surfaces 262 of interconnecting members 241 of front and/or rear U-bolt brackets/axle seals 228F and 228R in order to define a distance $D_s$ between the shims that is equal to or less than outside diameter $D_a$ of the axle, without changing the overall concept of the present invention. It is further contemplated that axle-to-beam connection 200 of the present invention could be formed by machining surfaces 262 of interconnecting members 241 of front and/or rear U-bolt bracket/axle seats 228 or the front and rear surfaces of axle 217 in order to create a distance $D_s$ between the surfaces of the interconnecting members of the front and rear U-bolt brackets/axle seats that is equal to or less than outside diameter $D_a$ of the axle, without changing the overall concept of the present invention. It is yet even further contemplated that axle-to-beam connection 200 of the present invention could be formed with front and rear U-bolt brackets/axle seats 228F,R having interconnecting members 241 and surfaces 262 that are angled symmetrically or asymmetrically with respect to one another. For example, terminal edges 259 of the front and rear U-bolt brackets/axle seats could be closer to one another than the opposite ends of the interconnecting member. It is understood that preferred embodiment axle-to-beam connection 200 of the present invention described in detail above, includes a means for attaching axle 217 to front and rear U-bolt brackets/axle seals 228F,R, which includes front and rear three-pass welds 290F,R. It is also contemplated that other means for attaching axle 217 to from and rear U-bolt brackets/axle seats 228F,R could be utilized in place of three-pass welds 290F,R, such as a single, double or other multiple-pass weld, without changing the overall concept or operation of the present invention. It is understood that preferred embodiment axle-to-beam connection 200 of the present invention described in detail above, includes an additional means for securing the connection of axle 217 to beam 212, namely a pair of U-bolts 227. It is also contemplated that other additional means for securing the connection of axle 217 to beam 212 could be utilized in place of paired U-bolts 227, such as; a single U-bolt; a strap disposed around the axle, the strap being adhered directly to the axle or having a pin disposed into the axle in order to locate the strap with respect to the axle; a plate on the top of the axle, the plate being adhered directly to the axle or having a pin disposed into the axle in order to locale the plate with respect to the axle; or other similar additional means for securing the connection of the axle to the beam to provide additional locating support for the axle. It is also contemplated that the point and/or line contact between surfaces 262 of front and rear U-bolt bracket/axle seals 228F,R and the front and rear portions of axle 217, respectively, could also be area contact without changing the overall concept or operation of the present invention. It is even further contemplated that axle-to-beam connection 200 of the present invention could be utilized on vehicles having frames or subframes which are moveable or non-movable without changing the overall concept of the present invention. It is also contemplated that axle-to-beam connection 200 of the present invention could be utilized in conjunction with bottom-mount/underslung beams without changing the overall concept or operation of the invention. It is yet even further contemplated that axle-to-beam connection 200 of the present invention could be utilized on all types of leading and/or trailing arm beam-type axle/suspension system designs known to those skilled in the art without changing the overall concept of the present invention. For example, the present invention finds application in beams or arms that are made of materials other than steel, such as aluminum, other metals, metal alloys, composites, and/or combinations thereof. The present invention also finds application in beams or arms with different designs and/or configurations than that shown above, such as solid beams, shell-type beams, truss structures, intersecting plates, spring beams and parallel plates. The present invention also finds application in intermediary structures such as spring seats. It is yet even further contemplated that axle-to-beam connection 200 of the present invention could be utilized in conjunction with axles having varied wall thicknesses, without changing the overall concept or operation of the present invention.

Accordingly, the axle-to-beam connection of the present invention is simplified, provides an effective, safe, inexpensive and efficient structure and method which achieves all the enumerated objectives, provides for eliminating difficulties encountered with prior art axle-to-beam connections, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the axle-to-beam connection of the present invention is used and installed, the characteristics of the construction, arrangement and method steps, and the advantageous, new and useful results obtained; the new and useful structures, devices, elements, arrangements, process, parts, components and combinations are set forth in the appended claims.

What is claimed is:

1. An axle-to-beam connection for a suspension assembly of an axle/suspension system comprising:
   a) an axle, said axle having an outside diameter;
   b) a beam; said beam including:
      i) a pair of brackets, said pair of brackets being located a distance from one another to form at least a portion of an axle seat, said distance between the brackets being equal to or less than said axle outside diameter, said axle being disposed in the axle seat and between said brackets, the brackets extending to or beyond a selected centerline of the axle, said axle being fixedly attached to said brackets; and
      ii) a means for securing the connection of the axle to said beam.

2. The axle-to-beam connection of claim 1, whereby said distance between said brackets is less than said axle outside diameter.

3. The axle-to-beam connection of claim 1, said pair of brackets comprising a pair of U-bolt brackets.

4. The axle-to-beam connection of claim 1, said means for securing the connection of said axle to said beam comprising at least one U-bolt.

5. The axle-to-beam connection of claim 4, whereby said at least one U-bolt further comprises a pair of U-bolts, each one of said pair of U-bolts being disposed about a portion of said axle and being attached to each one of said pair of brackets.

6. The axle-to-beam connection of claim 1, further comprising a weld disposed at an interface between said axle and at least one of said pair of brackets, said weld being located at or beyond said selected centerline of said axle.

7. The axle-to-beam connection of claim 6, whereby said weld is a multiple-pass weld.

8. The axle-to-beam connection of claim 2, whereby said disposal of said axle in said axle seat and between said brackets results in a point or line contact interference lit between said axle and said brackets and a residual compressive stress field on said axle.

9. The axle-to-beam connection of claim 8, further comprising a weld being placed at an interface between said axle and at least one of said pair of brackets, said weld being located within said residual compressive stress field of said axle.

10. The axle-to-beam connection of claim 9, whereby said weld is a multiple-pass weld.

11. The axle-to-beam connection of claim 1, each one of said pair of brackets further comprising an interconnecting member having a terminal end said interconnecting member extending beyond said selected centerline and each one of said terminal ends being located a distance from one another to form at least a portion of an axle seat, said distance between said terminal ends being equal to or less than said axle outside diameter, said axle being disposed between said terminal ends.

12. The axle-to-beam connection of claim 1, said beam further comprising a pair of sidewalls, each of said sidewalls having an arch, said beam sidewall arches forming a part of said axle seat.

13. The axle-to-beam connection of claim 1, whereby said distance between said brackets is equal to said axle outside diameter.

14. The axle-to-beam connection of claim 13, whereby said disposal of said axle in said axle seat and between said brackets results in a contact fit between said axle and said brackets.

15. The axle-to-beam connection of claim 14, further comprising a weld being placed at an interface between said axle and at least one of said pair of brackets.

16. The axle-to-beam connection of claim 15, whereby said weld is a multiple-pass weld.

17. The axle-to-beam connection of claim 1, whereby said selected centerline of said axle comprises a horizontal centerline of the axle.

* * * * *

UNITED STATES PATENT AND TRADEMARK OFFICE
CERTIFICATE OF CORRECTION

PATENT NO. : 8,292,313 B2  
APPLICATION NO. : 13/007807  
DATED : October 23, 2012  
INVENTOR(S) : Phillippi R. Pierce et al.

Page 1 of 1

It is certified that error appears in the above-identified patent and that said Letters Patent is hereby corrected as shown below:

Claim 8, Column 16, Line 21, delete the word "lit" and replace with the word "fit".

Signed and Sealed this  
Twenty-seventh Day of November, 2012

David J. Kappos  
*Director of the United States Patent and Trademark Office*